(12) United States Patent
Vakoc et al.

(10) Patent No.: US 6,377,391 B1
(45) Date of Patent: Apr. 23, 2002

(54) GAIN FLATTENING WITH NONLINEAR SAGNAC AMPLIFIERS

(75) Inventors: Benjamin J. Vakoc, San Mateo; Michel J. F. Digonnet, Palo Alto, both of CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 0 days.

(21) Appl. No.: 09/537,639

(22) Filed: Mar. 29, 2000

Related U.S. Application Data

(60) Provisional application No. 60/146,744, filed on Aug. 2, 1999.

(51) Int. Cl.[7] .................................................. H01S 3/00
(52) U.S. Cl. .................................. 359/337.1; 359/341.1
(58) Field of Search ........................... 359/341.1, 337.1, 359/174

(56) References Cited

U.S. PATENT DOCUMENTS 5,526,175 A * 6/1996 Minelly et al. ............. 359/341

OTHER PUBLICATIONS

Bruno Crosignani, et al., Kerr Effect and Chromatic Dispersion in Fiber–Optic Gyroscopes, *Journal of Lightwave Technology*, vol. LT–3, No. 4, Aug. 1985 pp. 914–918.

Yashuhiro Aoki, et al., Input Power Limits of Single–Mode Optical Fibers due to Simulated Brillouin Scattering in Optical Communication Systems, *Journal of Lightwave Technology*, vol. 6, No. 5, May 1988, pp. 710–719.

C. Balslev Clausen, et al., Polarization Sensitivity of the Nonlinear Amplifying Loop Mirror, *Optics Letters*, vol. 21, No. 19, Oct. 1, 1996, pp. 1535–1537.

D.M. Baney, et al., WDM EDFA Gain Characterization with a Reduced Set of Saturating Channels, *IEEE Phototonics Technology Letters*, vol. 8, No. 12, Dec. 1996, pp. 1615–1617.

M.E. Fermann, et al., Nonlinear Amplifying Loop Mirror, *Optics Letters*, vol. 15, No. 13, Jul. 1, 1990, pp. 752–754.

L. Leng, et al., 8–Channel WDM Soliton Amplification and Signal Recovery, ECOC '98—24th European Conference on Optical Communication, Madrid, Spain, Sep. 20–24, 1998, pp. 105–106.

PCT International Search Report, mailed Mar. 13, 2001.

* cited by examiner

*Primary Examiner*—Mark Hellner
(74) *Attorney, Agent, or Firm*—Knobbe, Martens, Olson & Bear, LLP

(57) ABSTRACT

An apparatus and a method provide gain flattening in communications systems wherein a large number of optical signals at different wavelengths must be amplified while maintaining signal power within an acceptable range. Because of differences in gain of typical optical amplifiers as a function of wavelength and input power, the signals at different wavelengths are not amplified by the same amounts. Thus, when amplified multiple times, certain signals tend to become severely attenuated to the point of being no longer useable. The present gain flattening apparatus and method cause signals having higher gain-power products to be attenuated by a greater amount in response to Kerr-induced phase shifting such that after multiple stages of amplification, all the signal powers converge toward a small range of acceptable output powers. The apparatus provides amplification, multiple times, of a series of signals with a plurality of wavelengths covering a very wide spectral range, while maintaining the power of all the signals within a small range. The spread of this signal power range is robust against changes in the signal power, against changes in the number of signals, and, to some degree, against changes in the amplifier's pump power. The apparatus design is also robust against manufacturing changes in the parameters of the apparatus' components. The apparatus and invention are preferably implemented as multiple nonlinear Sagnac amplifiers having erbium-doped fiber amplifiers positioned asymmetrically in an interferometer loop.

21 Claims, 17 Drawing Sheets

GAIN FLATTENING WITH NONLINEAR SAGNAC AMPLIFIERS

RELATED APPLICATION

This application claims priority under 35 U.S.C. §119(e) from U.S. Provisional Patent Application No. 60/146,744 filed on Aug. 2, 1999.

BACKGROUND OF THE INVENTION

1. Field of the Invention

The present invention is in the field of fiber optic communication systems, and, more particularly, is in the field of amplifiers for use in fiber optic communication systems.

2. Description of the Related Art

In order to satisfy the increasing demand for bandwidth, fiber optic communication systems are moving towards wavelength-division multiplexing (WDM), in which many channels at separate wavelengths are carried on the same fiber. Integral to most current fiber communication systems is the incorporation of erbium-doped fiber amplifiers (EDFAs). When EDFAs are integrated into WDM systems, the gain flatness of the amplifiers becomes critical. For example, a fiber communication line 100 comprising a serial chain of loss sections 110($i$) and gain sections 120($i$) is shown in FIG. 1A. In FIG. 1A, the loss sections 110($i$) are represented as lengths of fiber, and the gain sections 120($i$) are represented by EDFAs. Each loss section 110($i$) and an associated gain section 120($i$) is referred to herein as a "loss-gain section."

In a WDM system, multiple independent channels are input at discrete wavelengths. The gain of EDFAs is a function of the wavelength, with a typical unfiltered gain variation appearing in FIG. 1B. After propagation through the first loss-gain section 110(1), 120(1), the channels around 1532 nanometers have higher powers than the other channels due to the EDFA gain variation. Propagating through multiple loss-gain sections causes this disparity in channel powers to grow, and eventually causes the power of some channels out of the last loss-gain section 110($n$), 120($n$) to drop to unacceptable levels.

To illustrate the foregoing process, the input power spectrum is plotted in FIG. 2A, and the output power spectrum after 5 loss-gain sections (i.e., n=5 in FIG. 1A) is plotted in FIG. 2B. The differences in the two spectra in FIGS. 2A and 2B illustrate the large disparity in resulting channel powers caused by EDFA gain variations.

Many prior solutions to this problem have involved adding a filter to the EDFA to produce a gain-filter section which is flatter than the gain of the EDFA alone. However, fabricating a filter with a correct shape, which is independent of EDFA parameters (e.g., signal and pump powers) and which is stable with time and temperature, is not trivial.

SUMMARY OF THE INVENTION

The present invention is directed to gain flattening with nonlinear Sagnac amplifiers. The use of nonlinear Sagnac amplifiers for gain flattening is a novel solution. Instead of using a filter which has a loss which varies as a function of wavelength, the present invention is directed to a filter which has a loss that is a function of power. More particularly, the filter in accordance with the present invention attenuates a specific channel i based on the power of that channel. The filter in accordance with the present invention does not provide a loss that is a conventional broadband power-dependent loss. Rather, the filter in accordance with the present invention provides a narrowband power-dependent loss. In other words, the attenuation of the filter at $\lambda_i$, the wavelength of channel i, is a function of the power around that wavelength (i.e., at $\lambda_i \pm \delta\lambda$), but is not a function of the power at a separate wavelength $\lambda_{i\pm n}$ outside of the $\lambda_i \pm \delta\lambda$ window. Such a filter is achieved by replacing a standard linear amplifier, as depicted in FIG. 1A, with a nonlinear Sagnac amplifier (NSA), which will be described in detail below.

One aspect of the present invention is an amplification system for reducing power differences in a plurality of output optical signals responsive to a plurality of input optical signals having a plurality of respective optical wavelengths and having a plurality of respective input powers. The amplification system comprises an interferometric loop. A coupler couples the plurality of input optical signals to the loop to cause respective first portions of the input optical signals to propagate in a first direction in the loop and to cause respective second portions of the input optical signals to propagate in a second direction in the loop. The coupler combines the first and second portions after the first and second portions propagate in the loop to produce a plurality of output optical signals. An amplifier is located at an asymmetric location with respect to the center of the loop. The amplifier has a gain spectrum which causes the amplifier to have a plurality of respective gains at the plurality of optical wavelengths. The asymmetric location of the amplifier with respect to the center of the loop causes differences in powers of the first signal portions and the second signal portions of the input optical signals while these portions are traveling through the interferometric loop. The differences in powers of the first and second signal portions cause respective phase shifts in the first and second signal portions to occur in the fiber loop due to the optical Kerr effect. The Kerr-induced phased shifts vary in response to differences in the respective input powers and the respective gains to cause a greater Kerr-induced attenuation of input optical signals having a greater gain-power product. Preferably, the amplifier comprises an erbium-doped fiber amplifier. Certain preferred embodiments further include a wavelength division multiplexed coupler in the loop proximate to the amplifier. A pump source is coupled to the wavelength division multiplexed coupler to provide pump light for the amplifier via the wavelength division multiplexed coupler.

Another aspect of the present invention is an amplification system for reducing output power differences in a plurality of output optical signals responsive to a plurality of input optical signals having a plurality of respective optical wavelengths and having a plurality of respective input powers. The amplification system comprises an interferometric loop which has first and second lengths of optical fiber separated by an optical amplifier. The first length of optical fiber is substantially longer than the second length of optical fiber. A coupler couples the optical signals into the interferometric loop to cause respective first and second portions of the optical signals to counterpropagate in first and second directions in the interferometric loop. The coupler combines the respective first and second portions of the optical signals after propagation through the interferometric loop to produce a plurality of respective output signals at the plurality of optical wavelengths. The plurality of output signals have a plurality of respective output powers. The amplifier has a gain characteristic which causes the amplifier to have a plurality of respective gains at the plurality of optical wavelengths. The first and second portions of the optical signals propagating in the first and second directions experience respective Kerr-induced phase shifts caused by self-phase modulation, by copropagating cross-phase modulation, and by counterpropagating cross-modulation. The location of the amplifier causes light propagating in the first direction to pass through the first length of optical fiber before propagating through the amplifier and the second length of optical fiber. The location of the amplifier also causes light propagating in the second direction to propagate through the second length of optical fiber and the amplifier before propagating through the first length of optical fiber. The location of the amplifier also causes the light propagating in the first direction to experience greater counterpropagating cross-phase modulation than the light propagating in the second direction. The location of the amplifier also causes the light propagating in the second direction to experience greater self-phase modulation and greater copropagating cross-modulation than light propagating in the first direction. The Kerr-induced phase shifts of the plurality of optical signals at the plurality of optical wavelengths are responsive to the respective amplifier gains at the plurality of optical wavelengths and are further responsive to the respective input powers of the plurality of optical signals, such that differences in the output powers caused both by differences in the input powers and by differences in the gains at the plurality of optical wavelengths are reduced.

Another aspect of the present invention is an optical amplification system which comprises a serial chain of at least first and second amplification sections. The first amplification section is coupled to receive a plurality of input optical signals. Each input optical signal has a respective optical wavelength and a respective input optical power. Each amplification section includes a respective amplifier therein. The amplifiers have respective gain characteristics such that gains applied to the optical signals vary with wavelength. The first amplification section provides a first plurality of optical output signals. The second amplification section is coupled to receive the first plurality of optical output signals and to provide a second plurality of optical output signals. Each of the second plurality of optical output signals has a respective optical wavelength and has a respective output optical power. The amplification sections operate to reduce differences in the respective output optical powers of the second plurality of optical output signals caused by differences in the input optical powers and by differences in gains applied to the optical signals. Each amplification section comprises an interferometric loop. The amplifier of the amplification section is located asymmetrically in the loop. A coupler couples light to the interferometric loop to cause the light to propagate as first and second counterpropagating portions at each of the optical wavelengths. The coupler also combines the first and second counterpropagating portions at each of the wavelengths after the first and the counterpropagating portions of the light have propagated through the loop. The first and second counterpropagating portions at each of the wavelengths interfere to provide an output signal at each of the wavelengths. The output signal at each of the wavelengths has a power responsive to input power at the wavelength, responsive to amplifier gain at the wavelength, and responsive to Kerr-induced phase shift at the wavelength. The Kerr-induced phase shift is greater for optical wavelengths having greater gain-power products to at least partially reduce differences in output power caused by differences in gain-power products. Preferably, each of the amplifiers comprises an erbium-doped fiber amplifier. Also preferably, the amplifiers have gains which vary with optical wavelength. The optical signals at the plurality of wavelengths have varying powers. The amplification sections operate to cause output powers at each of the wavelengths at the output of the serial chain to converge toward nominally the same output power within a selectable range of output power.

Another aspect of the present invention is a method of amplifying a plurality of input optical signals. The input optical signals have respective optical wavelengths within a range of optical wavelengths and have respective optical powers within a range of input optical powers. The method produces a corresponding plurality of output optical signals having respective output powers within a selected range of output optical powers. The method comprises passing the input optical signals through a first nonlinear Sagnac amplifier to produce a plurality of intermediate optical signals. The plurality of intermediate optical signals are responsive to the plurality of input optical powers, to amplifier gain and to Kerr-induced phase shift to have a respective plurality of intermediate optical powers within an intermediate range of optical powers. The intermediate range of optical powers is a smaller range than the range of input optical powers. The method further comprises passing the intermediate optical signals through at least a second nonlinear Sagnac amplifier to produce the plurality of output optical signals. The plurality of output optical signals are responsive to the plurality of intermediate optical powers, to amplifier gain and to Kerr-induced phase shift to have a plurality of output optical powers within the selected range of output optical powers. The selected range of output optical powers is smaller than the range of intermediate optical powers and is smaller than the range of input optical powers.

Another aspect of the present invention is an optical system that comprises an input that receives optical input signals having wavelengths within a range of wavelengths. An output outputs optical signals responsive to the optical input signals. At least a first amplifier is interposed between the input and the output. The first amplifier has a first gain spectrum. The first gain spectrum varies with wavelength over the range of wavelengths to cause a first optical signal produced by the first amplifier at a first wavelength within the range of wavelengths to have a first optical power and to cause a second optical signal produced by the first amplifier at a second wavelength within the range of wavelengths to have a second optical power. The first optical power and the second optical power differ by a power difference. The system further comprises at least a second amplifier interposed between the first amplifier and the output. The second amplifier comprises a nonlinear Sagnac amplifier. The second amplifier operates to at least partially compensate for differences in gain of the first amplifier over the range of wavelengths to reduce the power difference between the first optical signal and the second optical signal.

Another aspect of the present invention is an optical system that comprises an input that receives optical input signals having wavelengths within a range of wavelengths and that comprises an output that outputs optical output signals responsive to said optical input signals. A first plurality of amplifiers of a first type are interposed between the input and the output. The amplifiers of the first type have a first gain spectrum that varies over the range of wavelengths to cause a first optical signal at a first wavelength within the range of wavelengths to be amplified with a first gain by the amplifiers of the first type and to cause a second optical signal at a second wavelength within the range of wavelengths to be amplified with a second gain by the amplifiers of the first type. The second gain differs from the first gain. A second plurality of nonlinear Sagnac amplifiers are interposed at selected locations in the optical system. The nonlinear Sagnac amplifiers operate to at least partially compensate for differences in the first gain and the second gain of the amplifiers of the first type to reduce power differences between the first optical signal and the second optical signal.

BRIEF DESCRIPTION OF THE DRAWINGS

The present invention will be described in detail below on connection with the attached drawings in which.

DETAILED DESCRIPTION OF THE PREFERRED EMBODIMENTS

Figure 3:
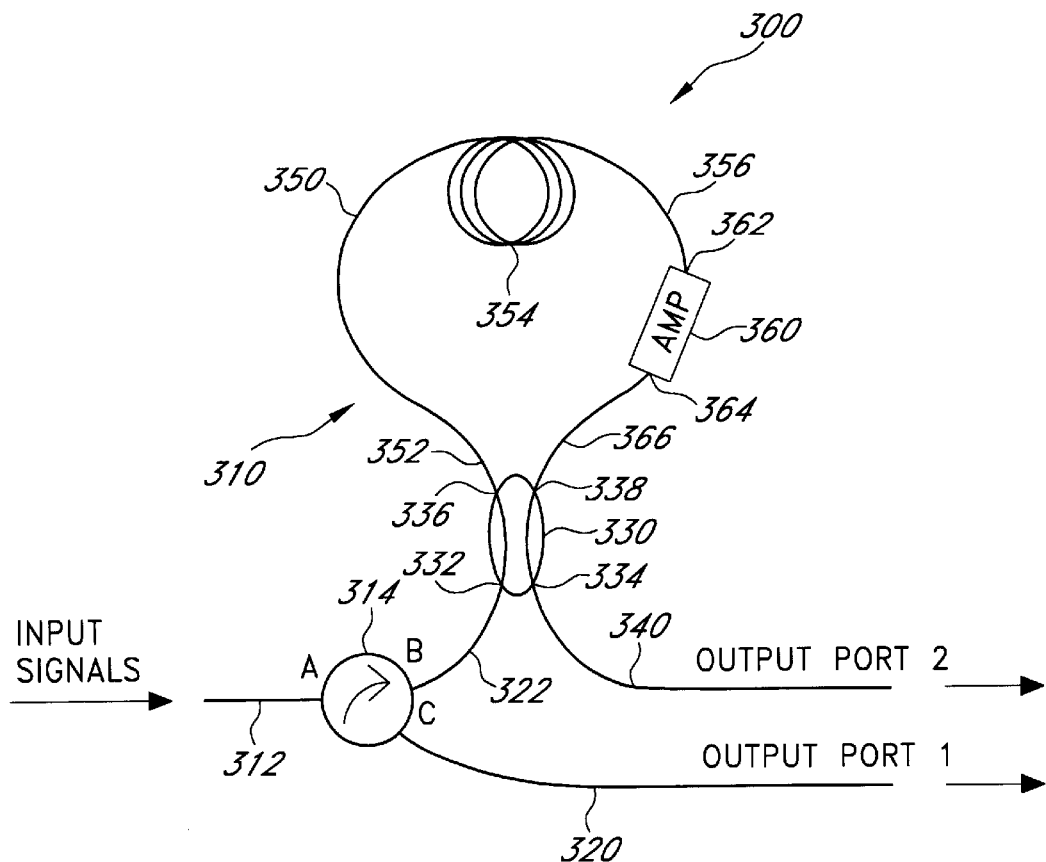
FIG. 3 illustrates an embodiment of a nonlinear Sagnac amplifier in accordance with the present invention.

FIG. 3 illustrates an embodiment of a nonlinear Sagnac amplifier (NSA) 300 in accordance with the present invention. The NSA 300 comprises a Sagnac interferometer 310 which is modified in accordance with the following description.

The NSA 300 comprises an input optical fiber 312 (or other suitable waveguide) which is coupled to a first port (A) of an optical circulator 314. The optical circulator 314 has a second port (B) and a third port (C). The optical circulator 314 operates in a known manner to cause light provided as an input to one port to propagate in a single direction (e.g., clockwise in FIG. 3) to the next port where substantially all the light is output from the circulator. In particular, in FIG. 3, light provided as an input to port A of the circulator 314 is output from port B of the circulator 314. Light provided as an input to port B of the circulator 314 is output from port C of the circulator 314. No light is provided as an input to port C of the circulator 314. Light does not propagate in the counterclockwise direction in the circulator 314. An exemplary optical circulator 314 is a polarization-independent fiber optic circulator, such as a Model PIFC23A211000 circulator available from E-Tek Dynamics, Inc., of San Jose, Calif. (Although the preferred embodiment of the present invention includes the optical circulator 314, the circulator 314 can be replaced by a standard 3-dB coupler (not shown) to provide a less expensive component for inputting signals to and returning signals from the Sagnac interferometer 310; however, it will be appreciated that such a coupler will induce splitting losses, which losses may be acceptable in some applications.)

Port C of the circulator 314 is connected to an output fiber 320 which provides an output port 1. Port B of the circulator 314 is connected via a fiber section 322 to a first port 332 on the input/output side of a conventional 2×2 optical coupler 330. The coupler 330 has a second port 334 on the input/output side of the coupler 330. The coupler 330 has a third port 336 and a fourth port 338 on the loop side of the coupler 330. The second port 334 of the 2×2 optical coupler 330 is connected to an output fiber 340 which provides an output port 2.

The third port 336 of the coupler 330 is coupled to a first end 352 of an optical fiber loop 354. The length of the optical fiber loop 354 is selected to provide a third-order nonlinear effect, as discussed below. The optical fiber loop 354 has a second end 356 which is coupled to a first port 362 of an optical amplifier (AMP) 360. The optical amplifier 360 has second port 364 which is coupled to the fourth port 338 of the 2×2 coupler 330 via a length 366 of optical fiber. The optical amplifier 360 is a bidirectional amplifier which amplifies light entering the first port 362 and provides the amplified light as an output on the second port 364. Similarly, the optical amplifier 360 amplifies light entering the second port 364 and provides the amplified light as an output on the first port 362.

Figure 3A:
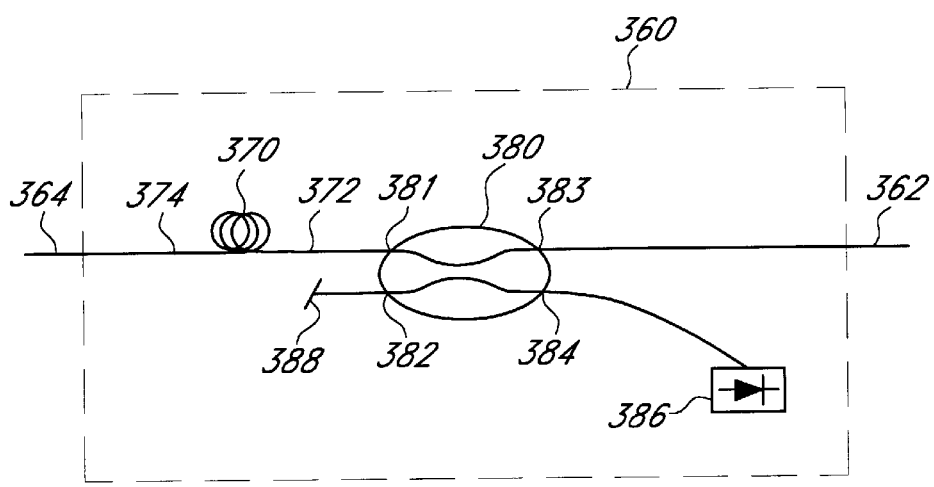
FIG. 3A illustrates a preferred embodiment of an optical amplifier of FIG. 3.

In particularly preferred embodiments, the optical amplifier 360 of FIG. 3 comprises an erbium doped fiber amplifier (EDFA). A preferred embodiment of the optical amplifier 360 implemented as an EDFA is illustrated in FIG. 3A. As illustrated in FIG. 3A, the optical amplifier 360 comprises a length of optical fiber 370 which has a first end 372 and a second end 374. The fiber 370 is doped with erbium. In alternative embodiments, the fiber 370 may be doped with another rare-earth element.

The second end 374 of the fiber 370 is connected to the second port 364 of the optical amplifier 360. The first end 372 of the fiber 370 is connected to a wavelength division multiplexing (WDM) coupler 380. The WDM coupler 380 has a first port 381, a second port 382, a third port 383 and a fourth port 384. The first end 372 of the optical fiber 370 is connected to the first port 381. The third port 383 is opposite the first port 381, and the third port 383 is connected to the first port 362 of the optical amplifier 360.

The fourth port 384 of the WDM coupler 380 is also opposite the first port 381 and is connected to a pump source 386. In the embodiment described herein, the pump source 386 advantageously comprises a light source operating at a wavelength of approximately 980 nanometers or 1,480 nanometers. In particularly preferred embodiments, the pump source 386 comprises a laser diode, or the like.

The second port 382 of the WDM coupler 380 is on the same side of the WDM coupler 380 as the first port 381. The second port 382 can be advantageously non-reflectively terminated by a terminator 388.

The WDM coupler 380 is configured to propagate light entering the coupler at the wavelength in the range of approximately 1,500 nanometers to approximately 1,650 nanometers or higher from the first port 381 to the third port 383 and from the third port 383 to the first port 381. Very little light in that range of wavelengths is coupled to the fourth port 384 or to the second port 382. The WDM coupler 380 is further configured to couple light entering the fourth port 384 at the pump wavelength (either around 980 nanometers or around 1,480 nanometers) to the first port 381. Because of the configuration of the WDM coupler 380, little, if any, pump light is coupled to the second port 382. Because of the non-reflective terminator 388, any such light will not be reflected back into the second port 382.

It can be seen that the WDM coupler 380 operates to couple pump light from the pump source 386 to the erbium-doped fiber 370 via the first port 381. In contrast, substantially no light at the signal wavelengths is coupled either to the second port 382 or to the fourth port 384. Thus, substantially all light at the signal wavelengths remains in the interferometric loop.

As shown in FIG. 3, the 2×2 optical coupler 330 and the fiber elements interconnecting the third port 336 and the fourth port 338 form the Sagnac interferometer 310, the operation of which is described below.

An input signal to be amplified is applied to the input fiber 312. The input signal comprises light having a plurality of wavelengths $\lambda_i$ (i=1, 2, . . . n). In a first preferred implementation of the present invention in communication systems, the signals are modulated either in phase or in frequency. Examples of such systems include phase-shift keying (PSK) and frequency-shift keying (FSK). In a second preferred implementation of the present invention in communication systems, the signals are modulated in amplitude; however, in such an implementation, limitations may apply due to pulse distortion and channel cross-talk.

The input signal propagates to port A of the circulator 314. The circulator 314 circulates the input signal to port B, and the input signal propagates via the fiber 322 to the first input/output port 332 of the 2×2 optical coupler 330. The 2×2 optical coupler 330 operates in a conventional manner to divide the input light into two substantially equal portions, wherein a first portion is coupled to the third port 336 and a second portion is coupled to the fourth port 338.

The first portion of the input signal propagates from the third port 336 of the 2×2 optical coupler 330, through the loop 354 in a clockwise (CW) direction, to the first port 362 of the optical amplifier 360. The light is amplified in the optical amplifier 360, and the amplified first portion propagates from the second end 364 of the optical amplifier 360 to the fourth port 338 of the 2×2 optical coupler 330 via the length of optical fiber 366.

The second portion of the input signal propagates from the fourth port 338 of the 2×2 optical coupler 330, propagates to the second end 364 of the optical amplifier 360 and is amplified therein. The amplified second portion then propagates from the first end 362 of the optical amplifier 360 and propagates through the loop 354 in the counterclockwise (CCW) direction to the third port 336 of the 2×2 optical coupler 330.

The amplified first portion of light entering the fourth port 338 of the 2×2 optical coupler 330 and the amplified second portion of light entering the third port 336 of the 2×2 optical coupler 330 are interferometrically combined therein. Depending on the phase relationship between the two signal portions, the combined signal is output from the first port 332 or from the second port 334 or from both ports of the 2×2 optical coupler 330. Light output from the second port 334 propagates to the output port 2 via the output fiber 340. Light output from the first port 332 propagates to port B of the circulator 314, is coupled to port C of the circulator 314, and propagates to the output port 1 via the fiber 320. The power in the output port 1 and the power in the output port 2 thus depend on the phase relationship between the clockwise propagating and counterclockwise propagating signals.

As described above, the optical amplifier 360 is positioned asymmetrically in the interferometer 310 such that the optical amplifier 360 is optically closer to the fourth port 338 of the 2×2 optical coupler 330 than it is to the third port 336 of the 2×2 optical coupler 330. Because of the asymmetrical positioning of the optical amplifier 360, light entering the interferometer 310 via the fourth port 338 of the 2×2 optical coupler 330 is amplified by the optical amplifier 360 before propagating (in the counterclockwise direction) through the loop 354 and exiting via the third port 336. In contrast, light entering the interferometer 310 via the third port 336 propagates (in the clockwise direction) through the loop 354 before being amplified by the optical amplifier 360 and exiting via the fourth port 338. Thus, for the configuration shown in FIG. 3, the light propagating in the counterclockwise direction within the loop 354 experiences the gain of the optical amplifier 360 before propagating in the loop 354, and the light propagating in the clockwise direction within the loop 354 experiences the gain of the optical amplifier 360 after propagating in the loop 354. As discussed in more detail below, this difference in when the two counterpropagating light signals experience the gain of the optical amplifier 360 is advantageously used to achieve gain flattening.

As will be shown below, the desired filter performance is obtained by using the Kerr-induced phase shift generated in the Sagnac loop 354 to vary the gain in accordance with the power in each wavelength of the optical signal applied to the loop 354.

The Kerr-induced phase shift, $d\theta_i$, of a channel i of wavelength $\lambda_i$ results from a third-order nonlinearity in the fiber, and its effect is to impart a nonlinear phase shift on a beam given by:

$$d\phi_i = \frac{n_2 \kappa_i}{A_{\mathit{eff}}} (P_{\mathit{self}} + 2 P_{\mathit{other}}) dl. \qquad (1)$$

In Equation 1, $P_{\mathit{self}}$ is the power in channel i, $P_{\mathit{other}}$ is any other power in the fiber, dl is the interaction length, and $A_{\mathit{eff}}$ is the effective mode area. (A criteria for defining what the power is in channel i is presented below.) The parameter $n_2$ is the nonlinear coefficient, and the parameter $\kappa_i$ is the k vector for the signal at the wavelength $\lambda_i$ (i.e., $\kappa_i = 2\pi/\lambda_i$). Note that the Kerr-induced cross-phase modulation (phase modulation due to other channels) is a factor of two greater than the self-phase modulation (i.e., the phase modulation due to itself). It is assumed that all copropagating light within a given channel produces self-phase modulation on that channel and that all remaining light (including all other copropagating channels along with all counterpropagating channels) produces cross-phase modulation.

To calculate the effect of the Kerr-induced phase shift, it is assumed that N channels are launched into port 312 of the NSA shown in FIG. 3. The length of the loop 354 is L, the gain of the amplifier at $\lambda_i$ is $G_i$, and $P_i$ is the input signal power at $\lambda_i$ in the port 312.

Using Equation 1, the Kerr-induced phase shift accumulated by the $i^{th}$ channel traveling in the clockwise direction can be written as:

$$\theta_i^{CW} = \frac{n_2 \kappa_i}{2 A_{\mathit{eff}}} \left( P_i + 2 \sum_{j=1, j \neq i}^{N} P_j + 2 \sum_{j=1}^{N} G_j P_j \right) L_{\mathit{eff}}. \qquad (2)$$

In Equation 2, the factor 2 in the denominator is the result of splitting each input signal power into two portions by the coupler 330. The first term within the parentheses is the self-phase modulation. The second term within the parentheses is the cross-phase modulation due to other clockwise traveling channels. The third term within the parentheses is the cross-phase modulation due to all the counterclockwise traveling channels. Note that the third term has a factor of $G_j$ because each CCW traveling channel has experienced the gain $G_j$ of the amplifier 360 before traveling the Sagnac loop 354. The parameter $L_{\mathit{eff}}$ is the effective loop length and is defined by $L_{\mathit{eff}} = (1/\alpha)[1 - e^{-\alpha L}]$, where $\alpha$ is the fiber attenuation (assumed to be wavelength independent for simplicity).

Similarly, the Kerr-induced phase shift accumulated by the $i^{th}$ channel traveling in the counterclockwise direction is written as:

$$\theta_i^{CCW} = \frac{n_2 \kappa_i}{2 A_{\mathit{eff}}} \left( G_i P_i + 2 \sum_{j=1, j \neq i}^{N} G_j P_j + 2 \sum_{j=1}^{N} P_j \right) L_{\mathit{eff}}. \qquad (3)$$

In Equation 3, the gain $G_i$ is applied to the first two terms because the first two terms represent counterclockwise propagating signals, which experience the gain $G_i$ before propagating through the loop 354. Therefore, from Equation 2 and Equation 3, the Kerr-induced phase difference for channel i is given as:

$$\Delta \theta_i^{Kerr} = \theta_i^{CW} - \theta_i^{CCW} \qquad (4)$$

$$= \frac{n_2 \kappa_i}{2 A_{\mathit{eff}}} (G_i - 1) P_i L_{\mathit{eff}}.$$

In Equation 4, the numerical value of the nonlinear coefficient $n_2$ depends on several parameters, in particular the fiber material and the nature and concentration of the dopants it may contain. For example, for a nearly pure silica fiber core, the value of $n_2$ is typically around $2.4 \times 10^{-16}$ cm$^2$/W in the 1.3–1.6 $\mu$m spectral region. In silica-based fibers heavily doped with germanium, this value can be enhanced by a factor of a few.

Equation 4 is applicable, in particular, when all the signals involved have the same state of polarization. However, if all the signals involved do not have the same state of polarization, Equation 4 is still applicable, but the value of $n_2$ that must be used will depend on the relative polarization of the interacting signals. If the fiber loop of the present invention is made with a standard, low-birefringence fiber, the state of polarization of the signal in channel i will evolve along the fiber length. The first reason for this evolution is that the orientations of the axes of birefringence of the fiber vary along the length of the fiber. The second reason is that the orthogonal slow and fast polarization components of a particular channel i propagate at slightly different velocities and therefore experience slightly different phase shifts. Furthermore, because each channel has a different wavelength, and perhaps a slightly different input state of polarization, the state of polarization of each channel will evolve according to its own distribution. Therefore, in general, at any given point along the fiber the state of polarization of a given channel i, the state of polarization of all other copropagating channels j≠i, and the state of polarization of all counterpropagating channels j, will all be different. Because the index change due to the Kerr effect depends on the state of polarization of these various signals, in a long fiber loop (typically longer than a few tens of meters), the value of $n_2$ needs to be revisited.

The dependence of the Kerr-induced index change on polarization is rather complex (see, for example, C. B. Clausen, et al., "Polarization sensitivity of the nonlinear amplifying loop mirror," *Optics Letters*, Vol. 21, No. 19, October 1996, pp. 1535–1537). In a long enough optical fiber (again typically a few tens meters or longer), the state of polarization of each of the N signals will go through all possible states, while the fiber birefringent axes will vary through all possible spatial orientations. In this case, the Kerr-induced index change can be calculated by averaging first the relative phase of each signal, and second the spatial orientation of the fiber birefringent axes, as described in the Clausen, et al., reference cited above. Applying the methodology described in the Clausen, et al., reference to the loop configuration with imbalanced counterpropagating signal powers specific to the present invention, it can be shown that Equation 4 still applies, provided that $n_2$ is replaced by a smaller effective nonlinear coefficient $n_{2,\textit{eff}}$.

Given the two aforementioned dependencies of $n_2$, namely the dependence on signal polarization and the dependence on fiber composition, in the numerical simulations presented herein, unless otherwise specified we used a value of $n_{2\textit{eff}}$=5.47×10$^{-20}$ m$^2$/W. Although this value is well within the range of reported effective nonlinear coefficients, it is important to realize that it will vary, sometime substantially, from fiber to fiber. However, it is equally important to realize that the specific value of $n_{2\textit{eff}}$ used in these simulations is not critical to either the principle of the present invention or its practical applicability. The present invention can be utilized with fibers exhibiting either considerably smaller or orders of magnitude larger effective nonlinearities, provided the length of the fiber is adjusted accordingly. The present invention can also be utilized with optical waveguides and/or bulk materials exhibiting either considerably smaller or orders of magnitude larger effective third-order nonlinearities.

In Equation 4, the Kerr-induced phase difference is a function of only the power in channel i, which is exactly the narrowband behavior needed. The output of a Sagnac interferometer is a function of the phase difference between the interfering signals. Thus, the output of the Sagnac amplifier 300 is a function of this Kerr-induced phase difference as well as any phase bias between the two counterpropagating light signals. As discussed below, the Kerr-induced phase difference is converted into a wavelength-dependent attenuation via the operation of the Sagnac interferometer 310.

The transfer function of the NSA 300, which relates the input power of channel i to the output power of channel i on a particular port, is given by:

$$P_i^{out} = e^{-\alpha L} G_i P_i \frac{1 + \cos(\Delta\theta_i^{Kerr} + \phi_{bias})}{2}. \quad (5)$$

In Equation 5, $\phi_{bias}$ is the bias phase shift of the Sagnac interferometer 310 other than the Kerr effect, which, when the light is initially input to the port 312, is naturally 0 for output port 1 and π for output port 2. Using the Kerr-induced phase difference calculated above (Equation 4), the transfer function becomes:

$$P_i^{out} = e^{-\alpha L} G_i P_i \frac{1 + \cos\left(\frac{n_2 \kappa_i}{2 A_{\textit{eff}}}(G_i - 1) P_i L_{\textit{eff}} + \phi_{bias}\right)}{2}. \quad (6)$$

In Equation 6, it can be seen that $P_i^{out}$ is nonlinearly related to $P_i$. In particular, if the phase bias $\phi_{bias}$ and/or the length $L_{\textit{eff}}$ are selected properly, as the gain-power product $G_i P_i$ increases, the effect of the Kerr-induced phase difference is to multiply the gain-power product by a smaller and smaller ratio, so that increases in the gain-power product do not result in proportionate increases in the output power.

Furthermore, the output power $P_i^{out}$ in Equation 6 depends on the power $P_i$ in channel i, but it does not depend on the powers $P_j$ carried by any of the other channels j≠i. Thus, this effect, namely the fact that an increase in the gain-product does not result in a proportionate increase in the output power, is not affected by the power in the other channels. In other words, each channel acts on itself independently of the other channels. Thus, Equation 6 shows that the nonlinear Sagnac amplifier 300 achieves a narrowband power-dependent transfer function (gain).

Figure 4:
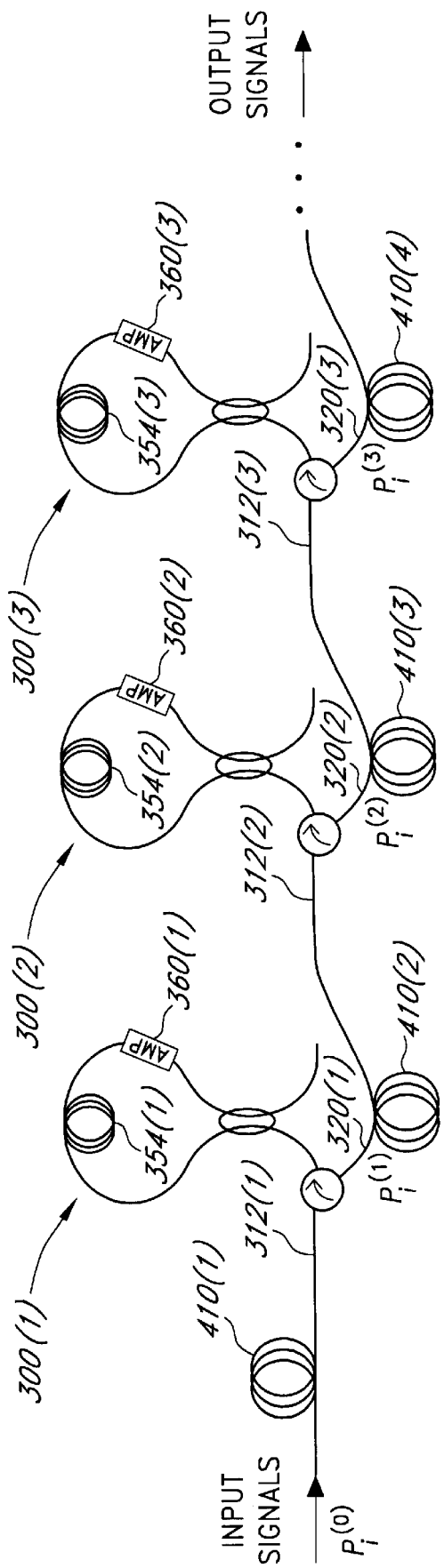
FIG. 4 illustrates a chain of nonlinear Sagnac amplifiers in accordance with the present invention.

In FIG. 4, a plurality of nonlinear Sagnac amplifiers (NSAs) 300 in accordance with FIG. 3 are coupled together to form a chain 400 of amplifiers which achieves gain flattening. The exemplary NSA chain 400 of FIG. 4 is formed by coupling an input signal to be amplified to a first fiber section 410(1) and then to the input fiber 312(1) of a first NSA 300(1). The output port 1 (fiber 320(1)) of the first NSA 300(1) is connected to the input fiber 312(2) of a second NSA 300(2) via a second fiber section 410(2). The output fiber 320(2) of the second NSA 300(2) is connected to the input fiber 312(3) of a third NSA 300(3) via a third fiber section 410(3), and so on, until a desired number of NSAs 300 are connected together. It should be appreciated that the fiber sections 410(i) represent lengths of fiber such as, for example, tens of kilometers (e.g., 70 kilometers) of fiber between amplifiers in a long distance communication system. The fiber sections can also represent losses, such as splitter losses, or the like, or a combination of component losses and fiber losses.

In FIG. 4, the amplifiers within each NSA 300 can be pumped by a common pump source, if the NSAs 300(i) are located close to each other, or the amplifiers can be pumped with individual pump sources.

In the following discussion, $L_{\textit{eff}}$ is the effective length of the Sagnac loop 354 in each NSA 300(i) of FIG. 4. For the purpose of the following discussion, it is assumed that a total loss from the output of one NSA 300(n) to the input of the next NSA 300(n+1) (including fiber attenuation and circulator insertion loss) is approximately the same for each NSA 300 and has a value of X. For example, for the following discussion X has a value of 0.01 (−20 dB). As shown in FIG. 4, $P_i^{(n)}$ is defined as the power of channel i at the output of the loss-gain section n of the NSA chain 400. The following values are also used in the following discussion:

$n_{2,\textit{eff}}$=5.47×10$^{-20}$ m$^2$/W; $A_{\textit{eff}}$=12 μm$^2$; α=−0.4 dB/km; λ=1.55 μm; $\phi_{bias}$=0; and $L_{\textit{eff}}$=10 km.

Note that for the following discussion, $L_{\textit{eff}}$ and the gains are assumed to be the same for each NSA(i) in FIG. 4. It should be understood that the values do not have to be the same in order for the present invention to operate.

The transfer function between $P_i^{(n)}$ and $P_i^{(n+1)}$ (the power at the output of the (n+1)$^{th}$ stage of the NSA chain 400) is given by:

$$P_i^{(n+1)} = e^{-\alpha L} P_i^{(n)} \frac{G_i X}{2}\left[1 + \cos\left(\frac{n_2 \kappa_i}{2 A_{\textit{eff}}}(G_i - 1) L_{\textit{eff}} P_i^{(n)} X + \phi_{bias}\right)\right]. \quad (7)$$

In Equation 7, the transfer function of a single NSA is based upon Equation 6, and further includes the effect of the loss X. In order to evaluate the NSA chain performance, the evolution of the NSA output powers $P_i^{(n)}$ as n increases is plotted in FIGS. 5A–5D, as discussed below.

The successive values of $P_i^{(n)}$ can be found by continuously applying the transfer function (Equation 7) to the initial power, $P_i^{(0)}$, i.e.,:

$$P_i^{(1)} = TF(P_i^{(0)})$$
$$P_i^{(2)} = TF(P_i^{(1)}) = TF(TF(P_i^{(0)})) \tag{8}$$

.
.
.

$$P_i^{(n)} = TF^{(n)}(P_i^{(0)}).$$

In Equation 8, $TF^{(n)}$ denotes the application of the function TF n times. A conceptual understanding of how $P_i^{(n)}$ evolves can be gained by performing this iterative process graphically. (See, for example, M. J. Feigenbaum, "Quantitative universality for a class of nonlinear transformations," *Journal of Statistical Physics*, Vol. 19, No. 1, pp. 25–52, 1978.) To this end, two curves are plotted in FIG. 5A. The first curve (curved line) represents the function $P_i^{(n+1)} = TF(P_i^{(n)})$, namely Equation 7. The second curve (straight line) represents the function $P_i^{(n+1)} = P_i^{(n)}$, namely a line of slope unity going through the origin.

Figure 5A:
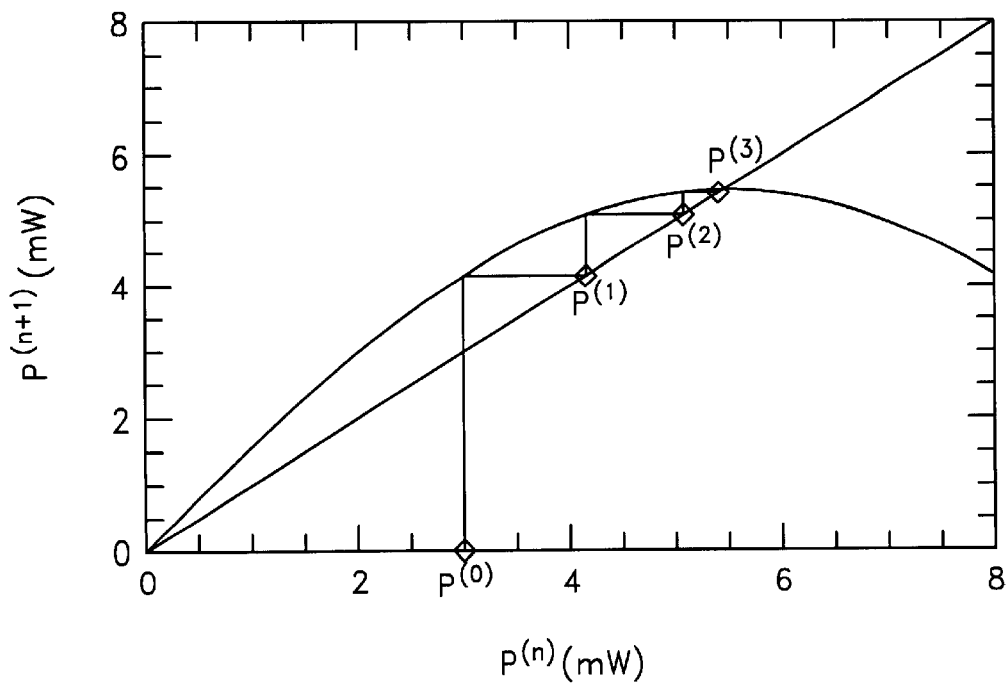
FIG. 5A illustrates a transfer function of an exemplary nonlinear Sagnac amplifier in accordance with the present invention, wherein the gain is 21.8 dB, wherein $P_i^{(n)}$ is the power of channel i at the output of the gain-loss section n and $P_i^{(n+1)}$ is the power of channel i at the output of the gain-loss section n+1, and wherein the output power converges to a steady state value.
Figure 5B:
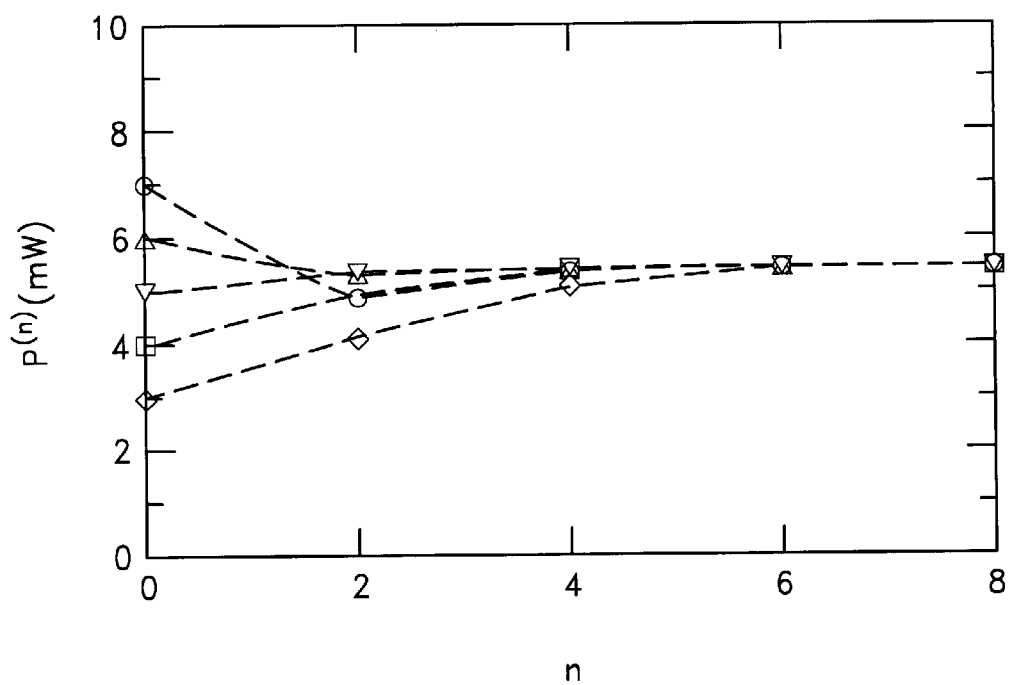
FIG. 5B illustrates the convergence of the output power $P_i^{(n)}$ of the gain-loss sections as a function of n for various initial values of $P_i^{(0)}$ for the transfer function of FIG. 5A.

The foregoing is illustrated in FIG. 5A for a gain, $G_i$ of 26 dB. An initial power, $P_i^{(0)}$, is chosen (in this case 3 milliwatts). A vertical line is then drawn from $x = P_i^{(0)}$ to $y = P_i^{(1)} = TF(P^{i(0)})$ on the transfer function (point A). To find $P_i^{(2)}$, a horizontal line is then drawn from point A on the transfer function to the $P_i^{(n+1)} = P_i^{(n)}$ line (point B). Then, a vertical line is drawn from point B to the transfer function (point C). This value is $P_i^{(3)}$. This process can be repeated to find any $P_i^{(n)}$, as illustrated for points D, E, F, G and H in FIG. 5A. For the transfer function plotted in FIG. 5A, $P_i^{(n)}$ converges to an asymptotic value of approximately 5 milliwatts (the intersection of the transfer function and the $y=x$ line at point H). The asymptotic value of $P_i^{(n)}$ is thus independent of the initial value for a large range of $P_i^{(0)}$. This is shown in FIG. 5B, which plots the value of $P_i^{(n)}$ as a function of n for five different initial values of $P_i^{(0)}$. Note that all values of $P_i^{(n)}$ converge to the same asymptotic value of approximately 5 milliwatts.

Figure 5C:
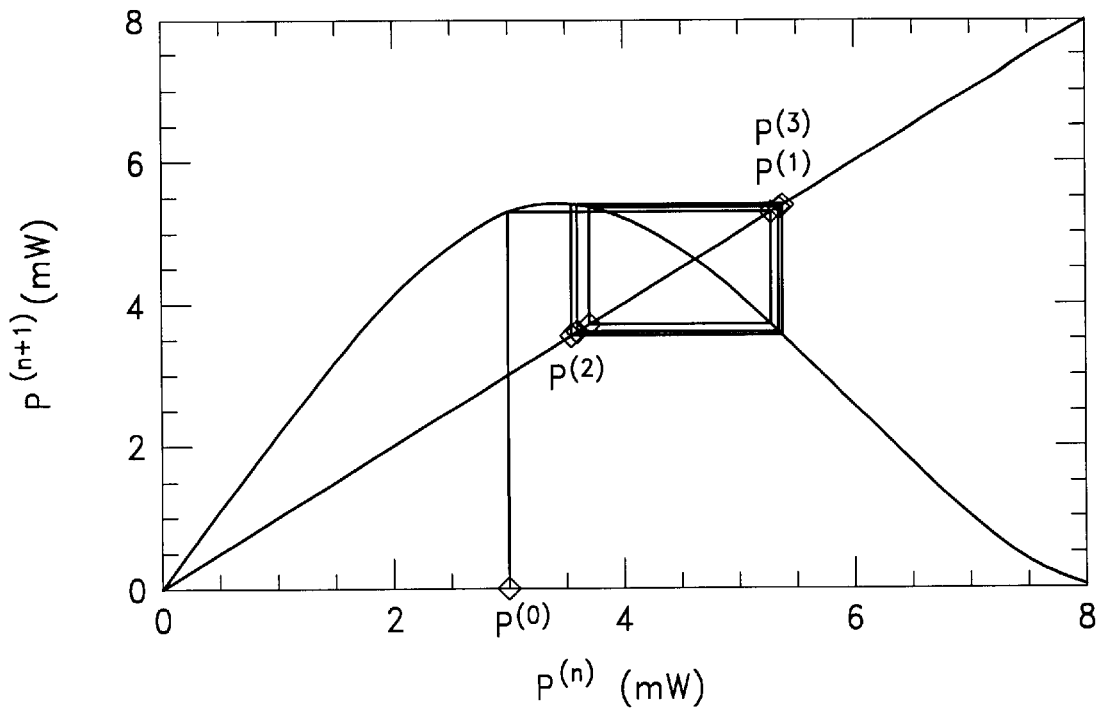
FIG. 5C illustrates a transfer function of an exemplary nonlinear Sagnac amplifier in accordance with the present invention, wherein the gain is 24 dB, wherein the increased nonlinearity of the transfer function with increased gain is shown, and wherein $P_i^{(n)}$ does not converge to a steady state value.

The convergence of $P_i^{(n)}$ to a single steady-state value is not the only possible behavior. As the gain is increased, the nonlinearity of the transfer function increases, and the magnitude of the slope of the transfer function can become greater than 1 at the point at which the transfer function crosses the $P_i^{(n+1)} = P_i^{(n)}$ line. When the magnitude of the slope of the transfer function is greater than 1 where the two functions cross, i.e., when the slope of the transfer function is either greater than +1 or smaller than −1, the asymptotic behavior is no longer single-valued but is instead oscillatory. This is illustrated in FIG. 5C, wherein the transfer function is plotted with the same set of parameters as in FIG. 5A except that the gain, $G_i$, has been increased from 26 dB to 28 dB. Rather than converging, the power, $P_i^{(n)}$, in FIG. 5C oscillates between an upper value (about 5 milliwatts) and a lower value (about 3.5 milliwatts). The oscillation can be seen more clearly in FIG. 5D, which graphically shows the evolution of $P_i^{(n)}$ as n increases. Note that for the example of FIGS. 5C and 5D, $P_i^{(n)}$ exhibits a periodic behavior, which in FIG. 5D has a period of 2.

Figure 5D:
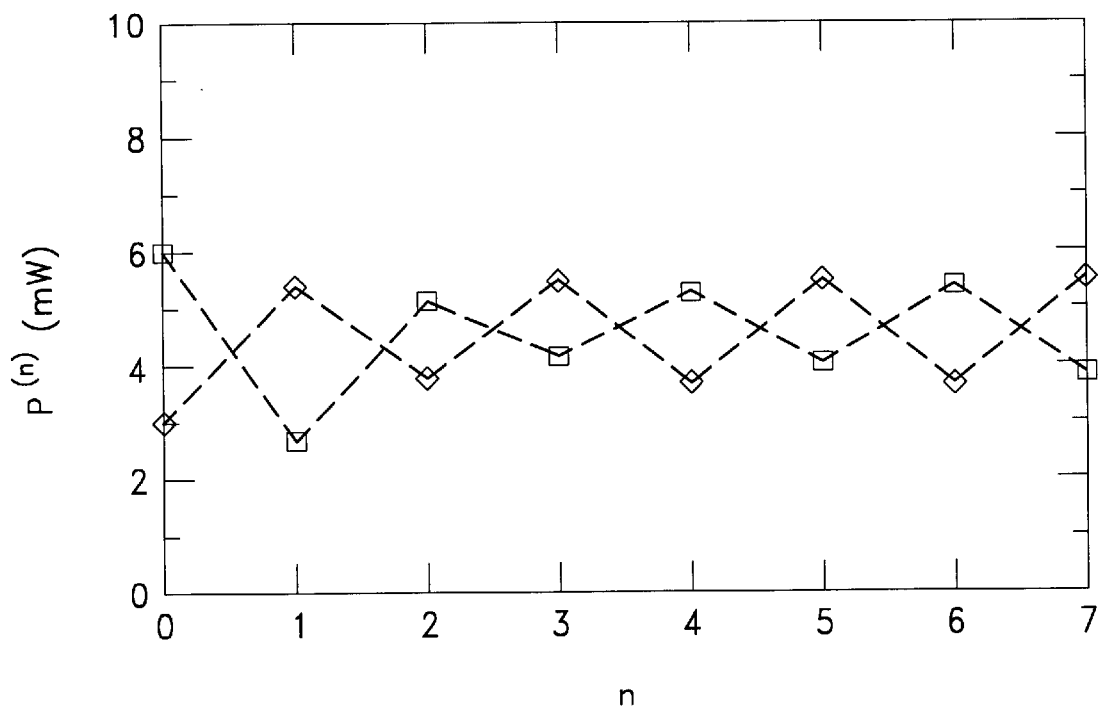
FIG. 5D illustrates the lack of convergence of the output power $P_i^{(n)}$ of the gain-loss sections as a function of n for various initial values of $P_i^{(0)}$ for the transfer function of FIG. 5C.
Figure 6:
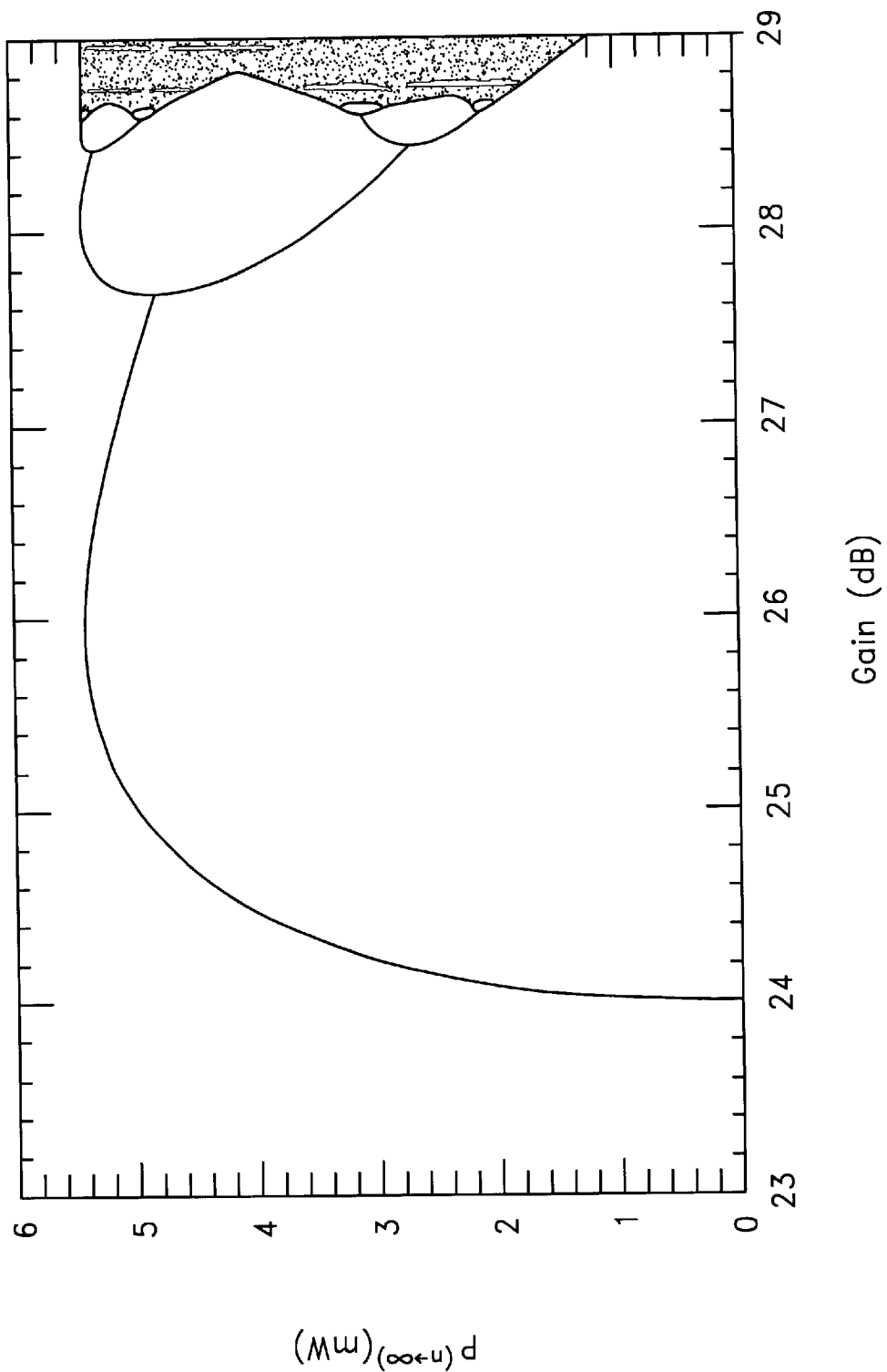
FIG. 6 illustrates a graph of the asymptotic behavior of $P_i^{(n)}$ as a function of the amplifier gain, showing that as the gain increases the power in the channel oscillates and then becomes chaotic.

As the nonlinearity of the transfer function TF further increases with increased gain $G_i$, the period shown in FIG. 5D doubles to 4, then to 8, then to 16, etc. With further increases in gain, the asymptotic behavior becomes chaotic. The foregoing is illustrated in FIG. 6, which plots the asymptotic value (or set of values) of $P_i^{(n)}$ as a function of gain. When the gain is lower than the loss in the segment fiber 410 and the loop fiber 354, the power $P_i^{(n)}$ converges to zero as expected. Once the gain becomes greater than the loss, $P_i^{(n)}$ converges to a non-zero value. When the gain reaches a value of about 27.6 dB, the asymptotic behavior of $P_i^{(n)}$ becomes periodic. $P_i^{(n)}$ first oscillates between two values. The difference between the two values becomes greater as the gain increases. As illustrated in FIG. 6, at approximately 28.46 dB of gain, $P_i^{(n)}$ begins oscillating between four values. At approximately 28.63 dB of gain, $P_i^{(n)}$ begins oscillating between eight values. For a very small range of gains, $P_i^{(n)}$ oscillates between 16 values, then 32 values (not shown), and then 64 values (not shown). For slightly higher gains, the asymptotic behavior of $P_i^{(n)}$ becomes chaotic, as approximately represented by the stippling and white bands in FIG. 6, such that no periodicity of the behavior can be determined. The irregular white bands are caused by narrow ranges of gain wherein the asymptotic behavior resumes periodic behavior. The present invention operates with a range of gains less than the gain where chaotic behavior begins, and it is not necessary to further discuss the chaotic behaviors shown in FIG. 6. Furthermore, the invention preferably operates at gains less than the gains wherein periodic behavior begins.

Figure 1A:
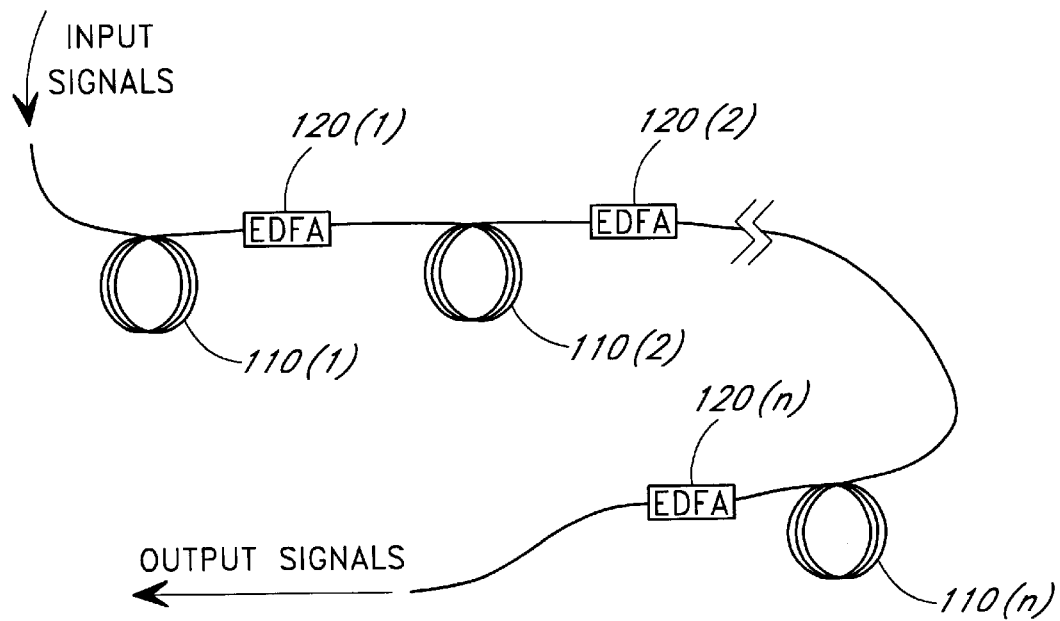
FIG. 1A illustrates a linear amplifier chain comprising a plurality of multiple loss-gain sections, wherein the loss sections comprise fiber sections and the gain sections comprise erbium doped fiber amplifiers (EDFAs)
Figure 1B:
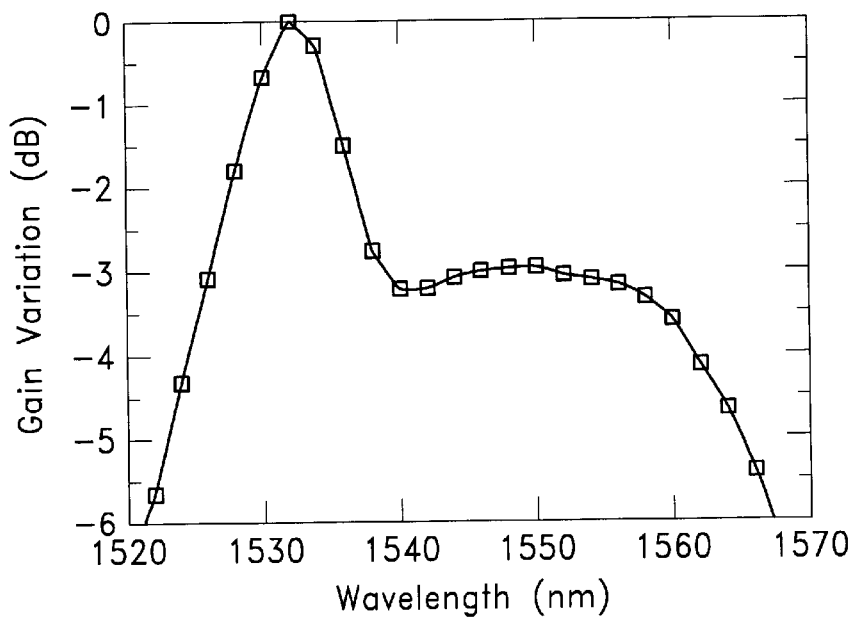
FIG. 1B illustrates the gain variation of an exemplary erbium doped fiber amplifier as a function of wavelength.
Figure 2B:
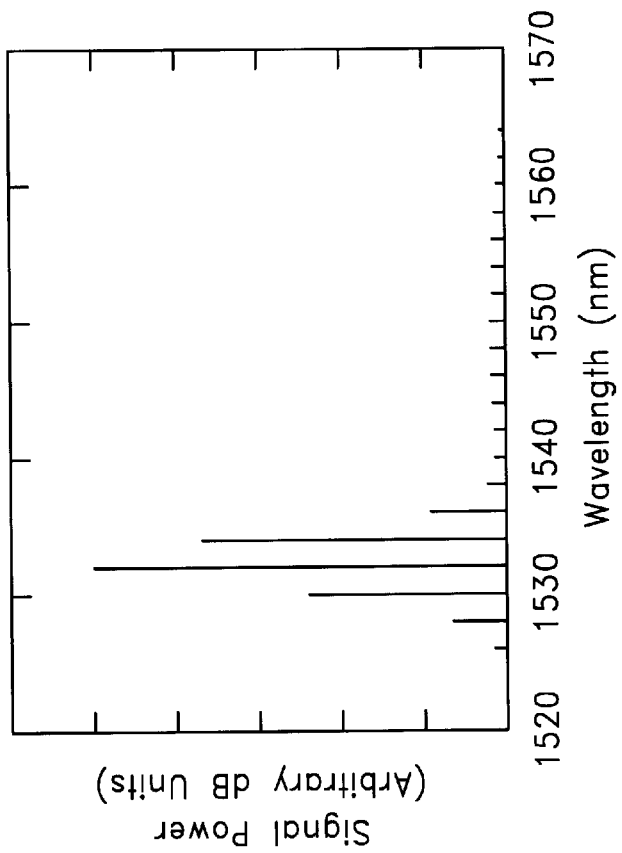
FIG. 2B illustrates the output power spectrum resulting from the input signal spectrum of FIG. 2A being applied to five gain-loss sections wherein the gain variation as a function of wavelength is shown in FIG. 1B.
Figure 2A:
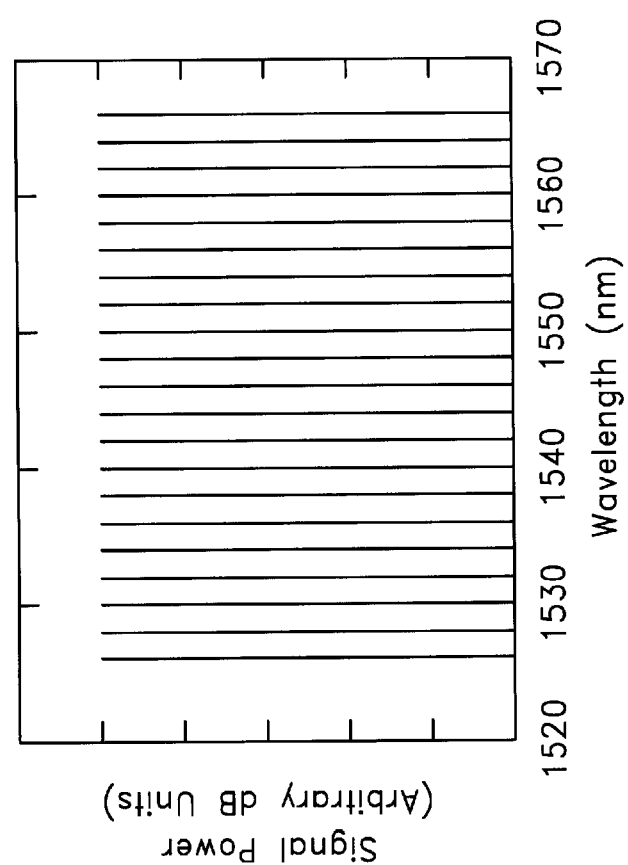
FIG. 2A illustrates the input power spectrum of a wavelength division multiplexed (WDM) system with an input signal having a channel spacing of 2 nanometers.

It can be seen that an NSA chain tends to force the power of a channel into a steady-state value due to the self-regulating transmission resulting from the Kerr-induced phase shift. For example, when two channels having wavelengths $\lambda_1$ and $\lambda_2$ and having corresponding gains of 25 and 27 dB, respectively, in an EDFA are applied to the input of a linear chain of EDFAs, such as illustrated in FIG. 1A, the channel at $\lambda_2$ eventually overwhelms the channel at $\lambda_1$, and $P_1^{(n)}$ (the power in the channel at $\lambda_1$) converges to 0. For the NSA chain 400, FIG. 6A shows that $P_1^{(n)}$ converges to approximately 5.0 milliwatts and $P_2^{(n)}$ converges to approximately 5.2 milliwatts. These values are sufficiently close to ensure that both channels arrive at the receiver with adequate power. The self-regulation of the NSA chain 400 prevents single channels from dominating, and thereby enables a larger number of channels to arrive at the receiver with adequate power to be detected. It has been observed from simulations that the convergence of the power to its steady state slows down as the gain approaches the region where periodic and chaotic behavior occurs. As shown from FIGS. 5B and 5D, the convergence at lower gains occurs after only a few iterations.

The foregoing description characterizes how the NSA chain 400 behaves. The following discussion describes the simulation of the NSA chain 400 to find optimal configurations. In order to evaluate various configurations, the relatively complicated behavior of the NSA chain 400 is first reduced to a single figure of merit parameter. In particular, for the purpose of the following discussion, the figure of merit is defined as an allowable gain variability, $\Delta G$. The allowable gain variability parameter describes a range over which the gain can vary while still forcing $P_i^{(n)}$ to converge to an acceptable asymptotic behavior.

In order to define what is acceptable behavior, the following limitation is placed on $P_i^{(n)}$:

$$\frac{XG_i P_i^{(n)}}{2} < P_{max}. \tag{9}$$

The restriction in Equation 9 places an upper limit on the amount of power exiting the optical amplifier 360 in the Sagnac loop fiber 356 in the counterclockwise direction. The factor of two in Equation 10 results from the 50-percent coupler 330 which splits the light into clockwise and counterclockwise beams. The upper power limit results from various undesirable nonlinear processes in the loop fiber, such as Brillouin scattering or four-wave mixing (FWM). The upper limit may also be set by limitations in the EDFA power output.

In order to select $P_{max}$, it is assumed that Brillouin scattering is the limiting nonlinear process. The critical power $P^{cr}$ above which Brillouin scattering becomes significant is given by G. P. Agrawal, *Nonlinear Fiber Optics*, Academic Press, San Diego, 1995, as:

$$P^{cr} \cong 21 \frac{A_{eff}}{g_B L_{eff}}. \quad (10)$$

In the approximation of Equation 10, the parameter $g_B$ is the Brillouin gain coefficient and is a function of the linewidth of each channel.

Figure 7A:
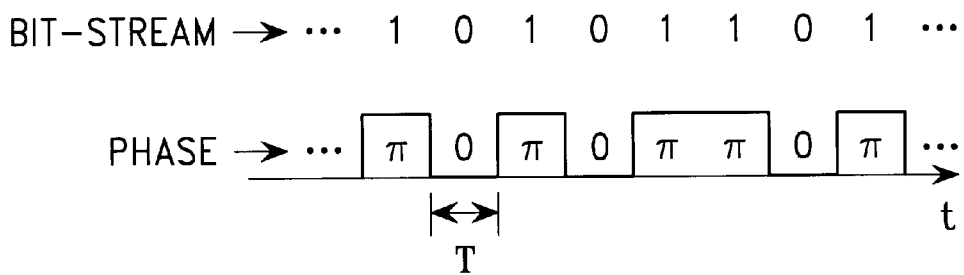
FIG. 7A illustrates an example of phase shift keying (PSK)
Figure 7B:
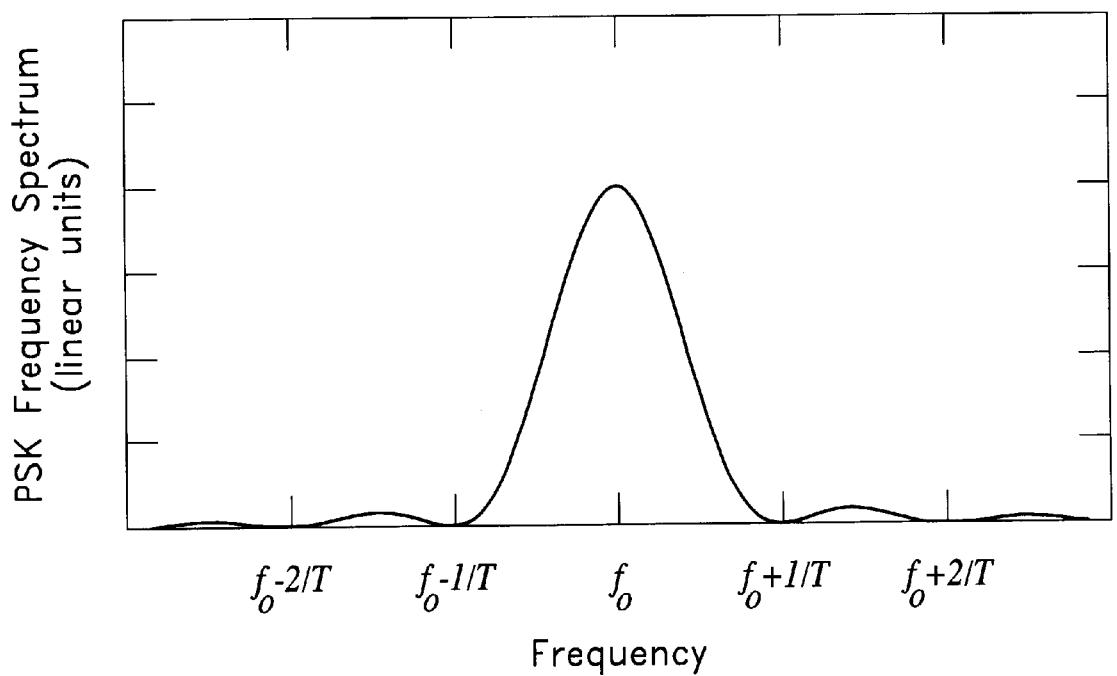
FIG. 7B illustrates the resulting spread in the channel spectrum for a pseudo-random bit pattern applied to a PSK system, wherein the amplitude is normalized in linear units.

For the following analysis, it is assumed that each channel employs phase-shift keying (PSK), in which 0 and 1 are encoded on a continuous wave (cw) laser by applying a 0 or $\pi$ phase shift, respectively, as illustrated in FIG. 7A. In FIG. 7A, each bit has a duration of T. This phase modulation spreads the linewidth of the channel. (See, for example, Y. Aoki, et al., "Input power limits of single-mode optical fibers due to stimulated Brillouin scattering in optical communication systems," *Journal of Lightwave Technology*, Vol. 6, No. 5, pp. 710–719, 1988.) For a pseudo-random bit pattern, the resulting frequency spectrum of a PSK channel with bit rate B=1/T is shown in FIG. 7B. The full width at half maximum (FWHM) linewidth of the PSK signal is approximately equal to B.

The increased linewidth shown in FIG. 7B results in an increased $P^{cr}$, as follows:

$$P^{cr} \cong 21 \frac{A_{eff}}{g_B L_{eff}} \frac{B + \Delta v_B}{\Delta v_B}. \quad (11)$$

Figure 8:
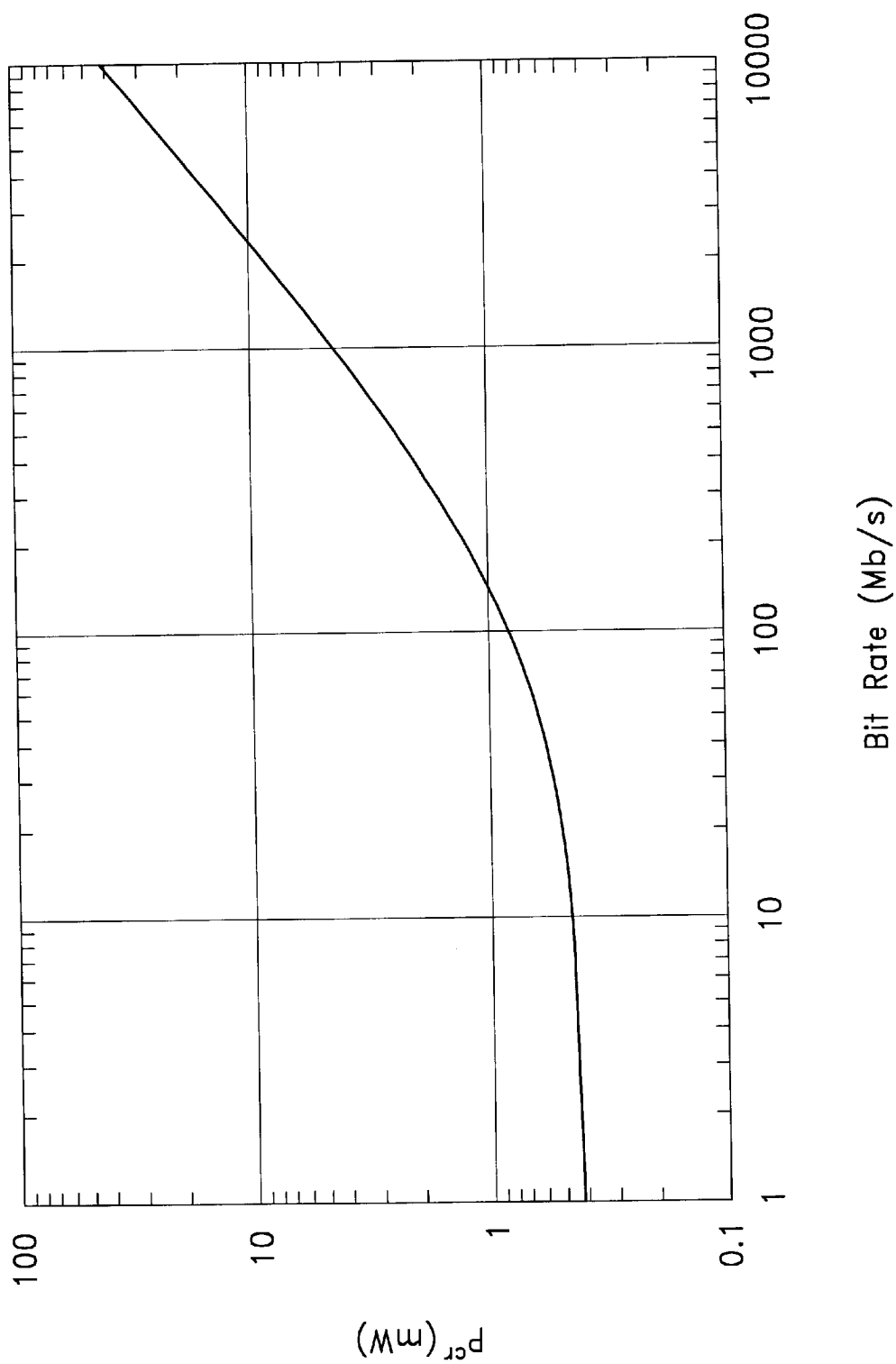
FIG. 8 illustrates $P^{cr}$, the critical power in milliwatts above which stimulated Brillouin scattering become significant, as a function of the bit rate, wherein the bit rate is shown in megabits per second on a logarithmic scale.

In the approximation of Equation 11, $\Delta v_B$ is the intrinsic Brillouin gain linewidth, which is between 10 and 100 MHz, depending on the fiber doping. The value of the Brillouin gain parameter, $g_B$, for silica fiber is $4.6 \times 10^{-11}$ meters/watt. With these parameters and with $A_{eff}$=9.0 $\mu m^2$ and $L_{eff}$=10 kilometers, the critical power, $P^{cr}$, for Brillouin scattering is plotted in FIG. 8 as a function of the channel bit rate. As shown in FIG. 8, $P^{cr}$ is well under a milliwatt for an unmodulated channel. However, $P_{cr}$ is greater than 10 milliwatts for a 2.5 gigabit per second channel. Although the value of $P^{cr}$ is calculated for the case of PSK, it should be understood that the present invention is compatible with other types of signal modulations, as discussed above. The example of PSK is used only to provide a specific value for $P^{cr}$.

Figure 9:
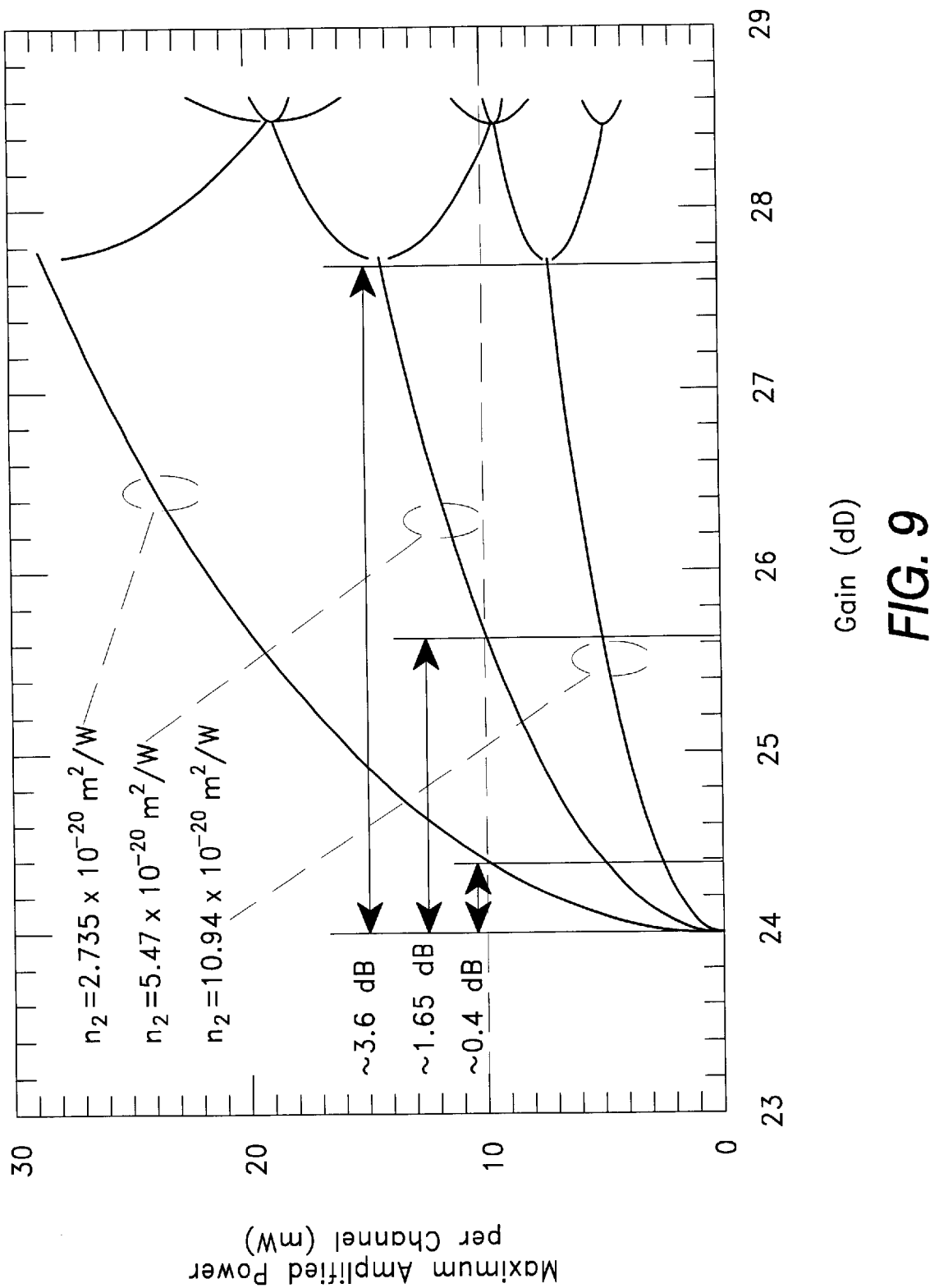
FIG. 9 illustrates a plot of the asymptotic values of $G_i P_i^{(n)} X/2$ as a function of gain.

As discussed in more detail below, the methodology for evaluating various configurations of NSA chains compares the resulting allowable gain variation $\Delta G$. To find $\Delta G$, the asymptotic values of $G_i P_i^{(n)} X/2$ is plotted as a function of gain in FIG. 9. From the plots, the ranges of gain for which Equation 9 is satisfied is determined. In FIG. 9, the nonlinear coefficient $n_2$ is varied while the other parameters are held constant. Note that higher values of $n_2$ force the asymptotic value of $G_i P_i^{(n)} X/2$ lower, enabling a larger $\Delta G$. If $P_{max}$ is set to 10 milliwatts, as shown by the horizontal line in FIG. 9, the value $n_2$=$5.47 \times 10^{-20}$ $m^2/W$ (a value currently achieved in commercially available fibers) produces a $\Delta G$ of 1.65 dB.

A moderate decrease in $n_2$ by a factor of 2 decreases $\Delta G$ to 0.4 dB. Likewise, an increase in $n_2$ by a factor of 2 increases $\Delta G$ to 3.6 dB (if the present invention is not operated in the oscillatory regime above approximately 27.6 dB).

Plots of the asymptotic values of $G_i P_i^{(n)} X/2$ versus gain can be generated as a function of other parameters such as L or $\phi_{bias}$ to further analyze and optimize the NSA chain.

Figure 10:
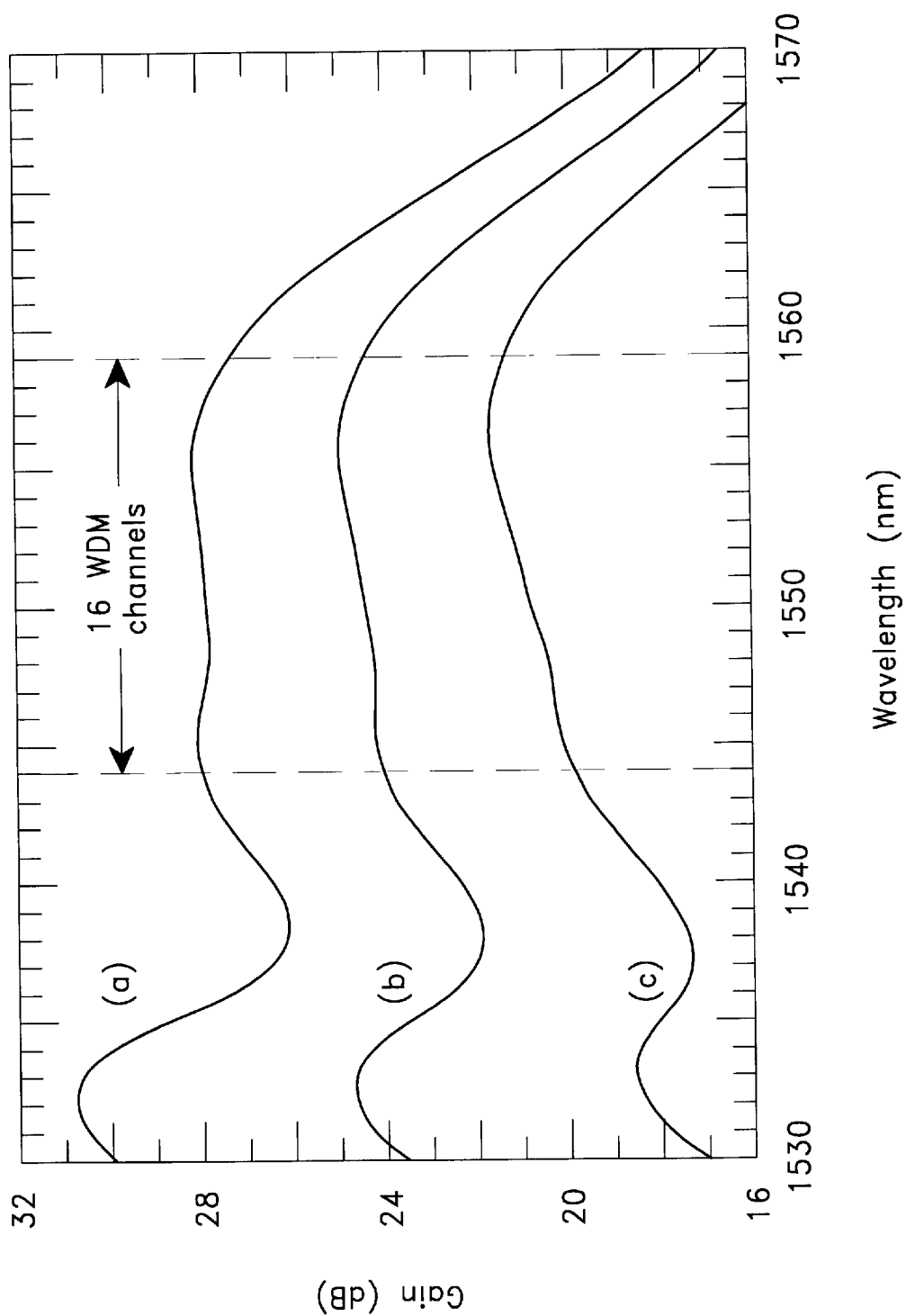
FIG. 10 illustrates the gain spectra for 16 wavelength division multiplexed channels for a total input signal power of 1.4 milliwatts (curve c), 0.56 milliwatts (curve b) and 0.22 milliwatts (curve a)

FIG. 10 illustrates the gain spectra for 16 wavelength division multiplexed channels for a total input power of 1.4 milliwatts (curve a), 0.56 milliwatts (curve b) and 0.22 milliwatts (curve b). The total input power is distributed equally amongst the 16 wavelengths, and is input into the EDFA from both sides as would be the case if the EDFA were inserted into a Sagnac loop. The parameters of the NSA chain are the same as those discussed above.

To simulate the behavior of a chain of NSAs, the gain experienced by each of the N input signals that travel through each individual amplifier in each NSA of the chain is first computed. Because the gain in an optical amplifier depends in a generally complex manner on the input signal powers through gain saturation, and because the input signal power spectrum is different for each amplifier, the gain experienced by each one of the N input signals at each amplifier in the chain should be computed to be completely accurate. Although all the gains can be calculated using existing EDFA simulation programs, the calculations are quite time consuming. Instead of calculating all the gains in this manner, the approximation described in D. M. Baney, et al., "WDM EDFA gain characteristics with a reduced set if saturating channels", *IEEE Photonics Technology Letters*, Vol. 8, No. 12, 1996, pp. 1615–1617, is used. The Baney, et al., reference teaches that the gain spectrum of an amplifier can be accurately calculated by replacing N input signals to the amplifier by a single input signal (called a saturating tone) of suitably selected wavelength and power. Specifically, according to the Baney, et al., reference, the gain spectrum of an amplifier operated with N input signals of individual power $P_i$ is very nearly equal to the gain spectrum of the same EDFA (i.e., the EDFA pumped under the same conditions) saturated by a saturating tone of wavelength $\lambda_s$ and power $P_s$ given by:

$$P_s = \frac{1}{\lambda_s G_s} \sum_{i=1}^{10} P_i G_i \lambda_i \quad (12)$$

In Equation 12, $G_i$ is the (saturated) gain at wavelength $\lambda_i$, $G_s$ is the (saturated) gain at wavelength $\lambda_s$, and $G_i$ and $G_s$ are linear gains (as opposed to gains expressed in dB). When inhomogeneous broadening in the EDFA is negligible, as is assumed here, the saturating tone wavelength $\lambda_s$ can be selected over a broad range of wavelengths without affecting the accuracy of the method. With this method, it is clear that the gain spectrum of the EDFA only needs to be computed for a range of saturating tone powers (instead of having to compute it for any arbitrary combination of N signal powers).

In practice, Equation 12 is not used directly because the saturated gains $G_i$ and $G_s$ are initially unknown. Instead, with an EDFA simulation program, the amplifier unsaturated gains $G_i$ and $G_s$ are first computed assuming a single saturating signal at $\lambda_s$ of power $$P_s = \sum_{i=1}^{16} P_i.$$

In a second step, the unsaturated gain values are inserted in Equation 12 to calculate an approximate value of $P_s$. This approximate value of $P_s$ is then used in the EDFA simulation program to calculate a second set of (saturated) is gains $G_i$ and $G_s$. The process is repeated until the gains converge to a stable value. In practice, convergence of the gains is obtained at the second step.

In the following discussion, the common situation of an EDFA with negligible inhomogeneous broadening is simulated. This simulation enables the selection (again, without loss of accuracy) of an arbitrary saturating tone wavelength $\lambda_s$ of 1,551 nanometers. To simulate the EDFA in the Sagnac loop, in which each signal of wavelength $\lambda_i$ travels in two directions, the saturating signal is input into both input ports of the EDFA with proper respective powers.

The EDFA simulated in FIG. 10 is a 7-meter section of erbium-doped fiber bidirectionally pumped by 110-milliwatt, 1,480-nanometer light (220 milliwatts total pump). The EDFA exhibits gain spectra as shown in FIG. 10. In the region from 1,544 nanometers to 1,559 nanometers where the 16 WDM signals are located (1-nanometer channel spacing), the typical gain variation was on the order of 1–2 dB, depending on the input signal power.

Figure 11A:
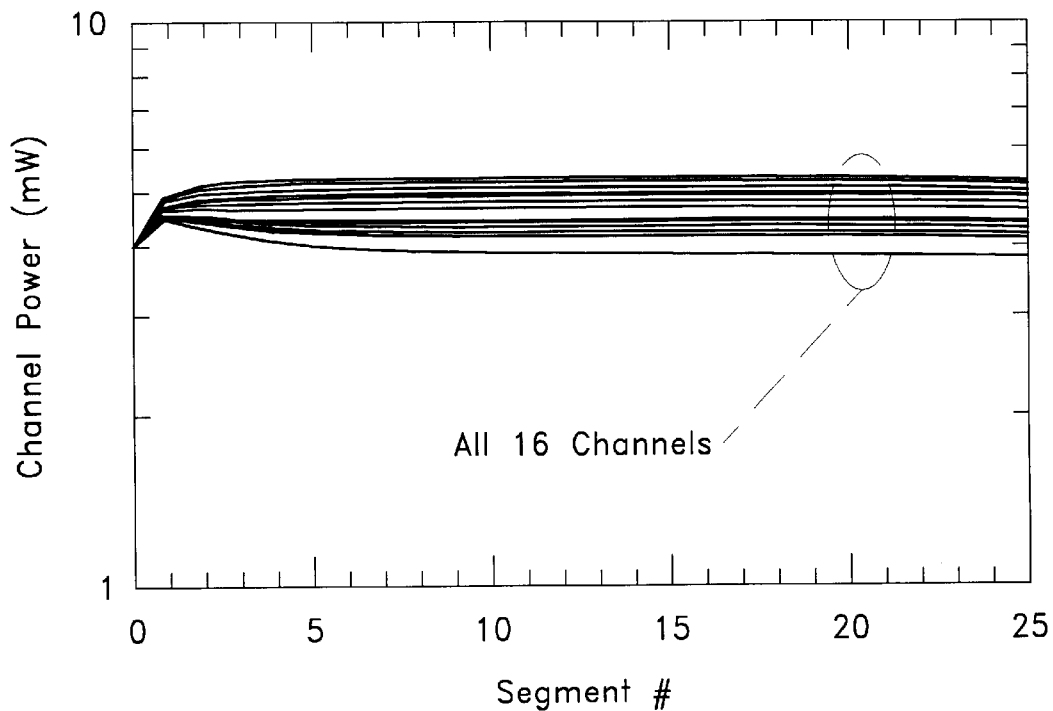
FIGS. 11A and 11B illustrate the evolution of the power in the 16 WDM channels of FIG. 10 for a chain of nonlinear Sagnac amplifiers (FIG. 11A) and for a chain of standard amplifiers (FIG. 11B)
Figure 11B:
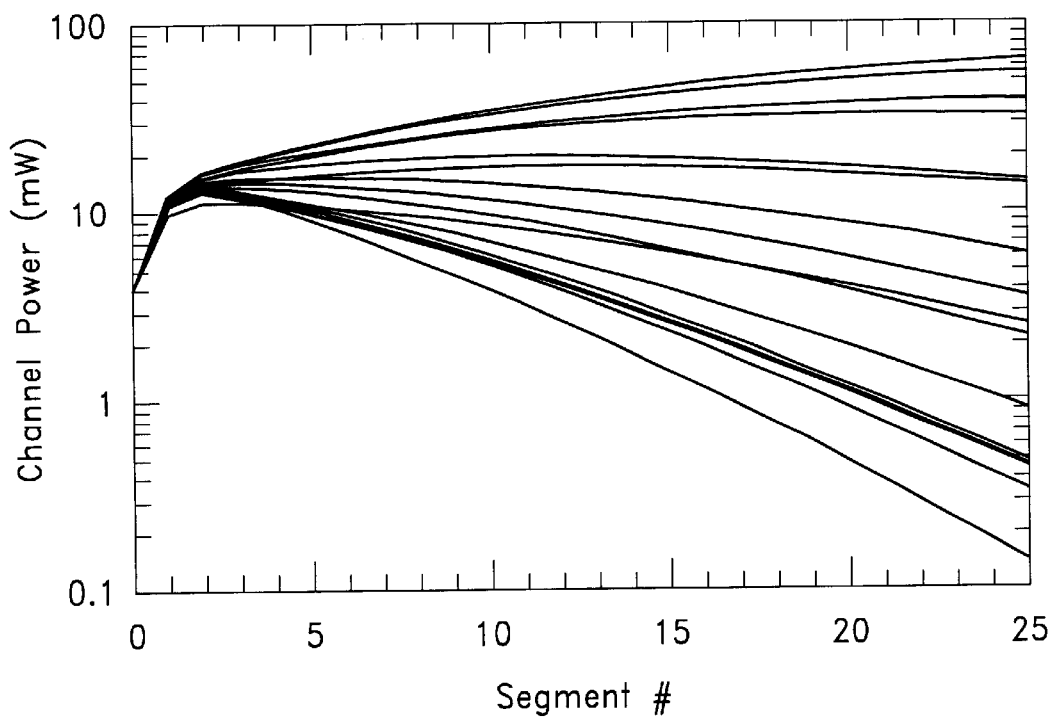

FIGS. 11A and 11B show the evolution of the power in all 16 channels as a function of the amplifier number for an NSA chain (FIG. 11A) and a standard amplifier chain (FIG. 11B). In the standard amplifier chain, the loss between sections (X) was increased from 20 dB to 24 dB to account for the 4-dB loss of the nonlinear fiber, which is set to zero in the simulator. The EDFA is identical to that used in the NSA chain. As shown, the NSA chain forces all powers into an asymptotic value such that all channels maintain a power between 3.7 milliwatts and 5.2 milliwatts. The convergence occurs after the first few NSAs. In the standard amplifier chain, the channels with the highest gains quickly dominate the other channels. The stabilizing effect of the NSA is therefore clearly seen by comparing FIG. 11A and FIG. 11B.

Figure 12A:
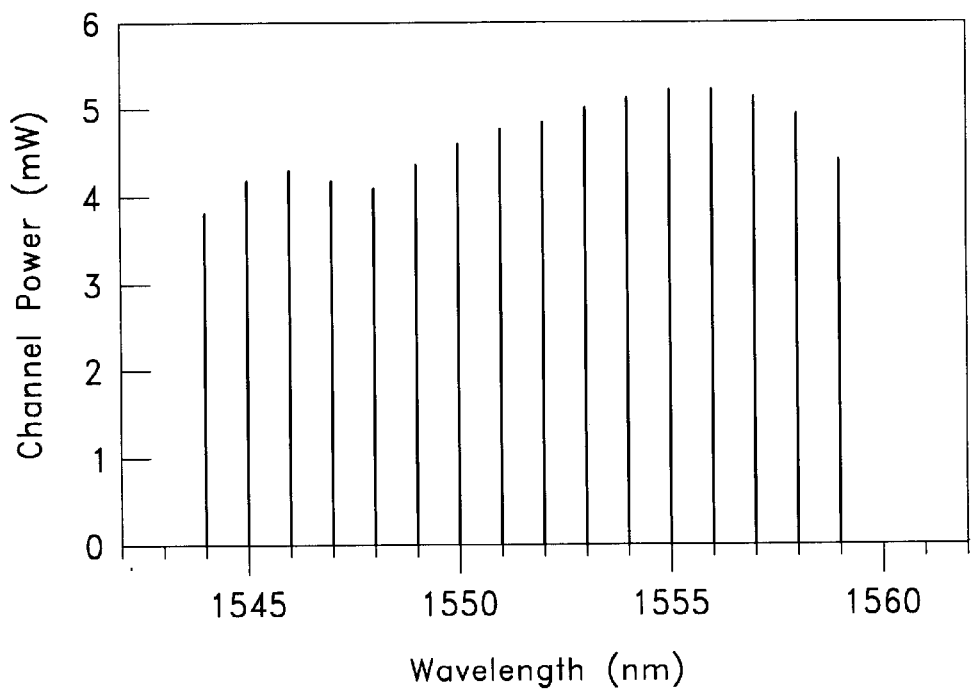
FIG. 12A illustrates the channel power spectrum for a chain of nonlinear Sagnac amplifiers after 20 segments.
Figure 12B:
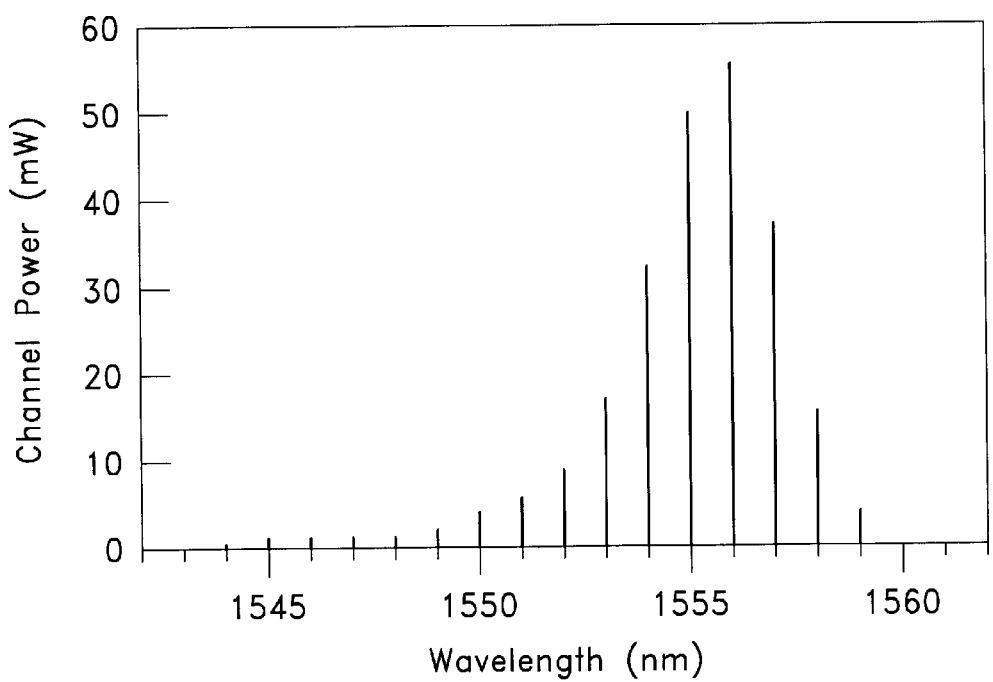
FIG. 12B illustrates the channel power spectrum for a chain of standard amplifiers after 20 segments.

The channel power spectrum is shown in FIGS. 12A and 12B for the NSA chain and the standard chain after segment 20, respectively. In the NSA chain, all channel powers are roughly equal after segment 20 (see FIG. 12A). In contrast, after segment 20 of the standard chain, there is a large disparity between the powers around 1,557 nanometers and the powers around 1,544 nanometers (see FIG. 12B). At the output end of the NSA chain (see FIG. 12A), all of the 16 output signals are useful, (i.e., they carry sufficient power to be detected with a high signal-to-noise ratio). In contrast, at the output end of the standard amplifier chain (see FIG. 12B), only about 6 of the 16 output signals are useful. All other signals carry too little power and cannot be detected with a sufficiently high signal-to-noise ratio to be useful. This comparison illustrates that the present invention produces output signals with approximately equal output powers over a large bandwidth after a large number of gain-loss sections.

The foregoing discussion illustrates the results of specific simulations which indicate the gain flattening achieved by the NSA chain 400 and also presents a method for evaluating the performance of the NSA chain 400, namely by using the parameter $\Delta G$ to find the maximum allowable gain variation.

It will be appreciated by one skilled in the art that the present invention achieves true (i.e., without external feedback) automatic gain control (AGC). It achieves automatic gain control in the sense that it automatically maintains the powers of a large number of signals at the output of a chain of gain-loss sections within a small range of power values, by correcting internally for unpredictable variations in the input signal powers, the pump powers, and the number of signals. In contrast, the overwhelming majority of optical gain flattening schemes developed to date do not exhibit true automatic gain control. Instead, the other schemes rely on additional external feedback schemes (which add complexity and cost to the system) to correct for variations in these quantities.

As discussed above, the Kerr-induced phase modulation from a second beam (cross-phase modulation) was twice that due to self-phase modulation, a feature which enables the NSA chain 400 to flatten the gain. The conditions for self-phase modulation and cross-phase modulation are addressed in the context of fiber-optic gyroscopes in B. Crosignani, "Kerr effect and chromatic dispersion in fiber-optic gyroscopes," *Journal of Lightwave Technology*, Vol. LT-3, No. 4, pp. 914–918, 1985, wherein it is shown that self-phase modulation and cross-phase modulation are connected with the dispersion in the fiber. The information from the Crosignani article is used below to define the conditions for self-phase modulation and cross-phase modulation.

First, a characteristic bandwidth, $\Delta v'$, is defined as:

$$\Delta v' \equiv \frac{1}{2\pi}\sqrt{\frac{|A|}{L_{eff}}} \tag{13}$$

In Equation 13, $L_{eff}$ is the effective fiber length, as previously defined, and A is the fiber group-velocity dispersion (i.e., $1/A = d^2\beta/d\omega^2$, where $\beta$ is the propagation constant and $\omega$ is the frequency). The Kerr-induced phase shift of one frequency component at $v_1$ on another frequency component at $v_2$ can be considered self-phase modulation if $|v_1-v_2| \ll \Delta v'$. Likewise, cross-phase modulation occurs when $|v_1-v_2| \gg \Delta v'$. Equation 13 enables the computation of the value of $\Delta v'$ for a particular Sagnac loop.

The foregoing results impose limits on the channel bandwidth (i.e., the bit rate) and the channel separation of the nonlinear Sagnac amplifier. All the light within each channel is required to self-phase modulate all other co-propagating light in the same channel. Thus, the bandwidth of each channel, B, should satisfy the following relationship:

$$B \ll \Delta v' \tag{14}$$

In Equation 14, B is the bit rate $1/T$ for random PSK, where T is the bit duration. Thus, there is a relationship between the maximum bit rate of each channel and the parameters of the nonlinear Sagnac amplifier.

All the light within one channel is also required to cross-phase modulate all light in other channels. This implies that the channel spacing, $\Delta v_{channel}$, should satisfy the following relationship:

$$\Delta v_{channel} \gg \Delta v' \tag{15}$$

and thus, the channel spacing has a minimum value which is a function of the loop parameters.

Because the length, $L_{eff}$, of the loop is chosen to optimize the gain flattening performance, as discussed above, it is preferable to set $\Delta v'$ to an optimal value by modifying the group-velocity dispersion, A, of the loop fiber (see Equation 13). A typical value for $\Delta v'$ can be calculated by taking $L_{eff}$ to be 5 kilometers and $A^{-1}$ to be $3.28\times10^{-28}$ sec$^2$/meter (appropriate for a dispersion shifted fiber near the zero-dispersion wavelength). The two values yield a value of 124 GHz for $\Delta v'$. This value can be modified easily through the parameter A.

From the foregoing description, it can be seen that the nonlinear Sagnac amplifier in accordance with the present invention produces an output signal spectrum that is flat, notwithstanding significant differences in the power of input optical signals at different wavelengths. Furthermore, unlike known gain-flattening schemes, the flatness of the output signal spectrum generally improves with increasing number of gain-loss elements. The flatness of the output signal spectrum is quite good over a large bandwidth. For example, in a chain of nonlinear Sagnac amplifiers with EDFAs that are flat to within approximately 1–2 dB, the flatness after a large number of gain-loss sections is better than 1.5 dB over a very large bandwidth. In contrast, passive filters typically flatten the gain of an individual EDFA to within a few tenths of a dB, which is not sufficient to guarantee a flat gain after traveling through a large number of such EDFAs. For example, after traveling through 24 gain-loss sections comprising EDFAs flattened to 0.3 dB, the output signal spectrum flatness is typically 1.5 dB or worse. The NSA chain achieved this same level of spectrum flatness with amplifiers which are flattened to only 1–2 dB. In view of the foregoing, it can be seen that the nonlinear Sagnac interferometer is more beneficial as the size of the chain (i.e., the number of amplifiers in the chain) increases. This is particularly advantageous for chains comprising a very large number of amplifiers, such as, for example, a transoceanic communication bus.

As discussed above, the chain of nonlinear Sagnac amplifiers converges to a flat gain after a number of gain-loss sections. The number of amplifiers needed to obtain flat gain (e.g., an asymptotic gain value or a percentage (e.g., 90 percent) of the asymptotic gain value) is a system characteristic which can be adjusted by adjusting the parameters of the nonlinear Sagnac amplifiers in the chain. The ability to control this rate of convergence is significant because in some systems, a fast convergence is needed (e.g., convergence to flat gain after four amplifiers) and in other systems, a slower convergence is acceptable (e.g., convergence to flat gain after twenty amplifiers).

Figure 13:
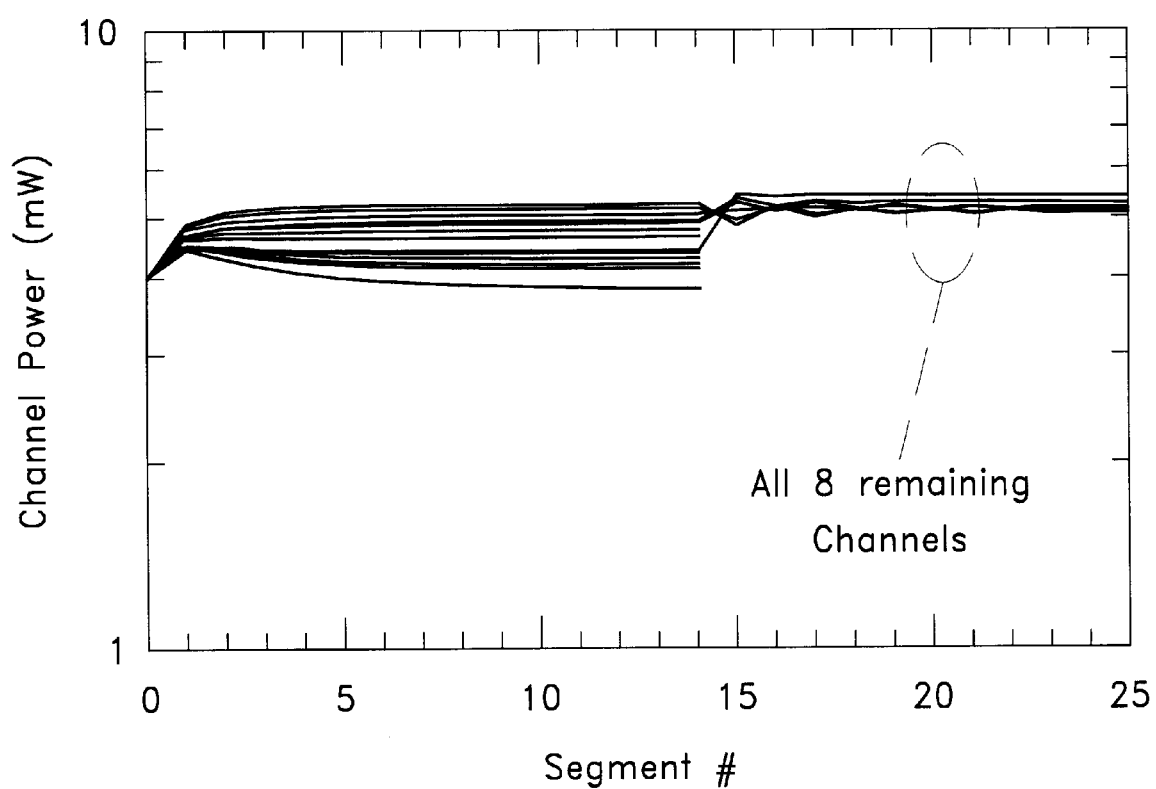
FIG. 13 illustrates the power evolution of a 16-channel WDM system in which 8 channels are dropped after the fourteenth and before the fifteenth nonlinear Sagnac amplifier.

Unlike EDFAs flattened with passive amplifiers, the system of the present invention is particular advantageous because the output signal spectrum remains very flat even when one or more of the input signals are dropped. When the power in one input signal is dropped, all of the output signals corresponding to the remaining (non-dropped) input signals will carry a higher power. However, the present invention keeps the flatness of the output signal spectrum from changing at all or from changing more than a very small amount. Similarly, the gain flatness does not change or changes very little if the power in one or more of the input signals changes (i.e., increases or decreases). To illustrate this, FIG. 13 shows the power evolution of a 16 channel WDM system in which 8 channels are dropped after the fourteenth and before the fifteenth NSA. The remaining eight channels now see a different gain and they therefore converge to different asymptotic values. The power deviation, however, is quite small, and all 8 remaining channels arrive at the end of the NSA with powers between 5 milliwatts and 5.5 milliwatts.

The output signal spectrum flatness is also robust to changes in the power that pumps one or more of the EDFAs in the chain of nonlinear Sagnac amplifiers. Changes in any or all of the pump powers cause changes in the optical gain and thus cause changes in the power carried by all the output signals at the output of the chain. However, because of the converging effect of the chain of nonlinear Sagnac amplifiers, the flatness of the output signal spectrum will be nominally unchanged (assuming the pump power changes are reasonably modest in magnitude). This robustness in the flatness of the output signal spectrum is not provided by filter-flattened EDFAs.

The flattening properties of a nonlinear Sagnac amplifier are more tolerant to manufacturing variations in the parameters of components than most other gain-flattened amplifiers, particularly when compared to gain-flattened EDFAs relying on passive filters in which each EDFA must be flattened with a particular filter matched to the particular gain curve of the EDFA. When passive filters are used, a given filter will flatten the gain of a particular EDFA operated under certain conditions, but the filter will perform poorly, if at all, if it is used with the same EDFA pumped with a different pump power or operated with a different number of signals or operated with different signal powers or a combination of differences. The filter may also perform poorly when the same filter is used with two nominally identical EDFAs made with erbium-doped fibers that are slightly different in design, in erbium concentrations, in co-dopant concentrations, in length, or in a combination of differences. Similarly, changes in the filter transmission spectrum (e.g., through changes in the external temperature) will alter the flatness of the chain gain. In contrast to conventional amplifiers having gain flattened by passive filters, a nonlinear Sagnac amplifier constructed in accordance with the present invention with a particular loop fiber and loop length can flatten the gain of EDFAs having a large range of characteristics, and the flatness of the output signal spectrum of the chain is robust to fluctuations in the parameters of the nonlinear Sagnac amplifiers.

The figures presented herein illustrate the performance of NSAs with loop lengths of 10 km. It should be understood that the choice of loop length impacts the system performance. For example, there is a tradeoff between length and mode confinement. In particular, the stronger the mode confinement, the shorter the length that is required. There is also a tradeoff between the loop length and the fiber nonlinearity. In particular, the stronger the fiber nonlinearity, the shorter the length that is required. Similarly, there is also a tradeoff between the loop length and the signal power. In particular, the stronger the signal power, the shorter the length that is required. NSAs with loop lengths either substantially shorter or substantially longer than 10 km can be designed to operate with nominally the same characteristics as described in this invention.

Although described above in connection with erbium-doped fiber amplifiers, the general principles of the nonlinear Sagnac amplifier described herein are not restricted to trivalent erbium ($Er^{3+}$) as the active dopant. The nonlinear Sagnac amplifier can also be used to flatten the gain of any optical amplifier based upon a fiber, a waveguide or a bulk optical component. The optical amplifier may use any active ion or active laser medium, and may operate over any portion of the spectral range. In particular, the nonlinear Sagnac amplifier may be used with Raman amplifiers, which may be used, for example, for amplification applications not suitably covered by other optical amplifiers. It should be noted that a Raman amplifier or other amplifier used in connection with the present invention should be bidirectional so that it can amplify the counterpropagating signals in the Sagnac loop. With respect to a Raman amplifier embodiment, the Raman amplifier can be operated in a resonant mode or it may be pumped in two different directions.

Figure 14A:
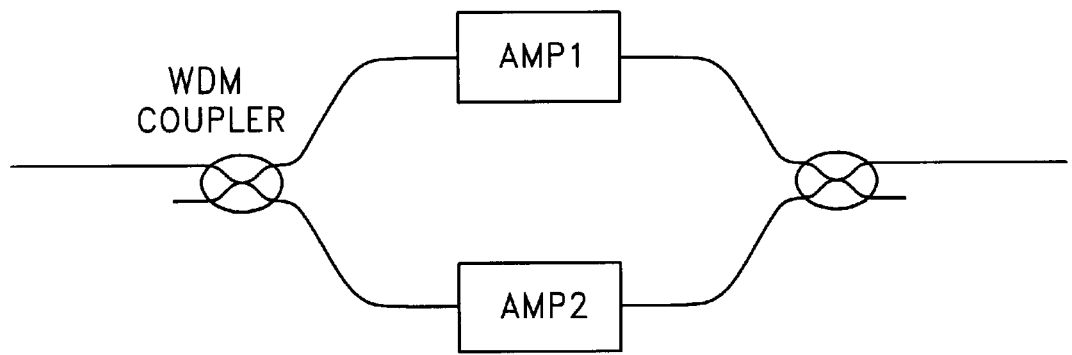
FIG. 14A illustrates an embodiment of an EDFA for use in the loop of a nonlinear Sagnac amplifier in which the EDFA comprises two amplifiers in parallel for amplifying two optical bands.

Note further that the foregoing embodiments have been described in connection with a single amplifier in each loop. One skilled in the art will appreciate that a single EDFA may have a limited amplification range. For example, a first amplifier AMP1 may amplify over one band of wavelengths and may absorb over a second band of wavelengths. A second amplifier AMP2 may absorb over the first band and may amplify over the second band. To provide amplification over both bands, the two amplifiers AMP1 and AMP2 may be positioned in the loop in parallel as a composite amplifier by using two WDM couplers. In other words, the nonlinear Sagnac amplifier of FIG. 3 is utilized with an amplifier 360 which is made of the parallel arrangement of the two amplifiers AMP1 and AMP2 shown in FIG. 14A, wherein AMP1 and AMP2 are two individual amplifiers configured, for example, like the amplifier of FIG. 3A.

Figure 14B:
FIG. 14B illustrates an embodiment of an EDFA for use in the loop of a nonlinear Sagnac amplifier in which the EDFA comprises two amplifiers in series for amplifying two optical bands.

Similarly, if a first amplifier AMP1 amplifies a first band and passes a second band and a second amplifier AMP2 passes the first band and amplifies the second band, the two amplifiers may be placed in series in the loop to provide amplification over both bands. This composite amplifier is illustrated in FIG. 14B. The individual amplifiers AMP1 and AMP2 can both be configured, for example, like the amplifier of FIG. 3A. Again, the nonlinear Sagnac amplifier then consists of the nonlinear Sagnac amplifier of FIG. 3 comprising an amplifier 360 which is made of the composite amplifier of FIG. 14B.

It should be understood that combinations of amplifiers in series and in parallel can be used to cover multiple bands of wavelengths.

Figure 15:
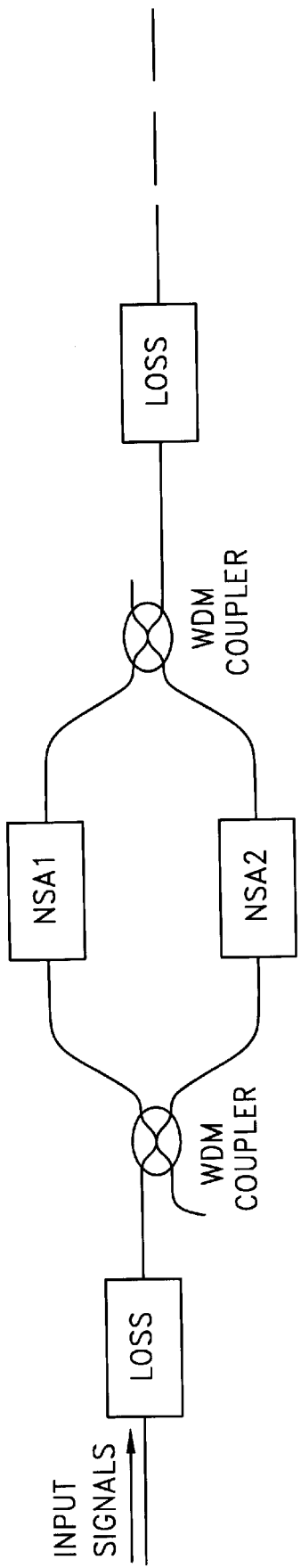
FIG. 15 illustrates a configuration having two nonlinear Sagnac amplifiers in parallel to provide amplification over two different optical bands.

In the event that amplification is required over a very wide spectral range, it may be necessary to provide separate loops for different portions of the spectral range so that the parameters of the loops can be optimized for the different portions of the spectral range. This configuration is shown schematically in FIG. 15, in which NSA1 and NSA2 represent two nonlinear Sagnac amplifiers that provide gain over different (and perhaps adjacent) portions of the spectrum (for example 1300 nanometers to 1350 nanometers for NSA1 and 1500 nanometers to 1650 nanometers for NSA2). The first WDM coupler acts to separate the input signals and direct them to the appropriate nonlinear Sagnac amplifier, namely to direct signals with wavelengths between 1300 nanometers and 1350 nanometers (in this example) to NSA1 and to direct signals with wavelengths between 1500 nanometers and 1650 nanometers to NSA2. The second WDM coupler recombines the signals exiting NSA1 and NSA2 onto the communication fiber (represented by the loss box in FIG. 15).

Figure 16:
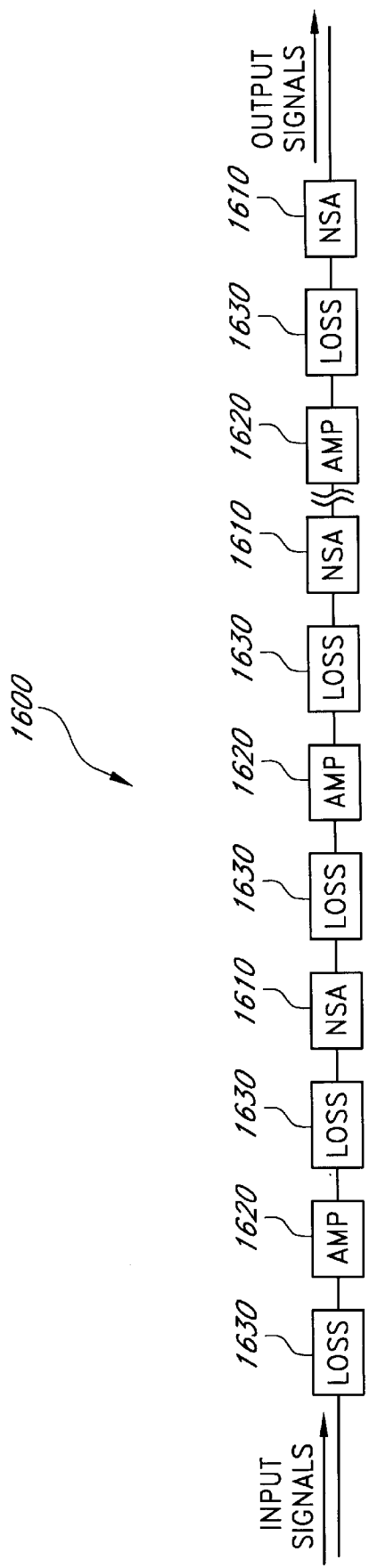
FIG. 16 illustrates an alternative embodiment to the embodiment of FIG. 4, wherein selected ones of the nonlinear Sagnac amplifiers in a chain are replaced with standard amplifiers.

An alternative embodiment to the embodiment of FIG. 4 is illustrated in FIG. 16. In the embodiment of FIG. 16, a gain-loss string 1600 comprises both nonlinear Sagnac amplifiers (NSAs) 1610 and standard optical amplifiers (AMPs) 1620 separated by loss sections 1630. In particular, in the embodiment illustrated in FIG. 16, the NSAs 1610 and the AMPs 1620 are positioned alternatively (i.e., every other amplifier). The percentage of nonlinear Sagnac amplifiers in the chain illustrated in FIG. 16 is thus 50% (i.e., one nonlinear Sagnac amplifier 1610 for every standard amplifier 1620). The percentage of nonlinear Sagnac amplifiers 1610 in the chain can be smaller (for example, every third amplifier in the chain can be a nonlinear Sagnac amplifier 1610) or larger (for example, every third amplifier in the chain can be a standard amplifier 1620) depending on the degree to which the standard amplifiers 1620 are individually flattened. For example, if the standard amplifiers 1620 are not flattened well, only one standard amplifier 1620 may be used for every few nonlinear Sagnac amplifiers 1610. If the standard amplifiers 1620 are moderately well flattened, every other amplifier may be a standard amplifier 1620. If the standard amplifiers 1620 are very flat, only one nonlinear Sagnac amplifier 1610 needs to be placed in the string 1600 every so often (for example, every third amplifier is an nonlinear gagnac amplifier 1610 and the rest of the amplifiers are standard amplifiers 1620). This hybrid chain 1600 is advantageous because (1) it maintains a high gain flatness even after a very large number of gain-loss sections, and (2) it makes the amplifier-loss chain robust to changes (intentional or unintentional) in the input conditions (i.e., the number of signals, the signal power, or the pump power). The hybrid chain 1600 is beneficial because by substituting relatively inexpensive standard amplifiers 1620 for the more expensive nonlinear Sagnac amplifiers (which have the fiber loops and optical circulators), a significant cost reduction can be obtained.

Although described herein in connection with the flattening of the gain of amplifiers having gains which vary with wavelength, the present invention can also be used with individual amplifiers having a gain which exhibits either no or little wavelength dependence. The invention works even better (i.e., it provides a flatter gain after fewer amplifiers) if the gain spectra of the individual amplifiers are flatter.

The present invention can also be used with individual amplifiers with a gain spectrum that is nominally flat (e.g., to within 0.3 dB over an 80-nanometer bandwidth), which can be accomplished by a number of techniques well known in the art. In this case the invention performs the function of maintaining or even improving the gain flatness after a large number (e.g., tens) of amplifiers. In contrast, if the same individual amplifiers are strung together in the traditional linear amplifier chain, as described above in connection with FIG. 1A, the amplifier string yields an increasing deterioration of the gain flatness as the number of gain-loss section is increased.

Furthermore, when using the present invention with individual amplifiers, which each has a gain spectrum that is nominally flat (e.g., to within 0.3 dB over an 80-nanometer bandwidth), the present invention provides a nominally flat gain spectrum that is robust against changes in the signal power, against changes in the number of signals, and, to some degree, against changes in the pump power.

Although described above in connection with particular embodiments of the present invention, it should be understood the descriptions of the embodiments are illustrative of the invention and are not intended to be limiting. Various modifications and applications may occur to those skilled in the art without departing from the true spirit and scope of the invention as defined in the appended claims.

What is claimed is:

1. An amplification system for reducing output power differences in a plurality of output optical signals responsive to a plurality of input optical signals having a plurality of respective optical wavelengths and having a plurality of respective input powers, said amplification system comprising:

an interferometric loop;

a coupler which couples said plurality of input optical signals to said loop to cause respective first portions of said input optical signals to propagate in a first direction in said loop and to cause respective second portions of said input optical signals to propagate in a second direction in said loop, said coupler combining said first and second portions after said first and second portions propagate in said loop to produce a plurality of output optical signals;

an amplifier located at an asymmetric location with respect to a center of said loop, said amplifier having a gain characteristic which causes said amplifier to have a plurality of respective gains at said plurality of optical wavelengths, said asymmetric location of said amplifier with respect to the center of said loop causing differences in powers of said first signal portions and said second signal portions of said input optical signals, said differences in powers of said first and second signal portions causing respective Kerr-induced phase shifts in said first and second signal portions, said Kerr-induced phased shifts varying in response to differences in said respective input powers and said respective gains to cause a greater Kerr-induced attenuation of input optical signals having a greater gain-power product.

2. The amplification system as defined in claim 1, wherein said amplifier comprises an erbium-doped fiber amplifier.

3. The amplification system as defined in claim 2, further comprising:

a wavelength division multiplexed coupler in said loop proximate to said amplifier; and a pump source coupled to said wavelength division multiplexed coupler, said pump source providing pump light for said amplifier via said wavelength division multiplexed coupler.

4. The amplification system as defined in claim 1, wherein said amplifier comprises at least a first amplifier, which provides amplification over a first band of wavelengths, and comprises at least a second amplifier, which provides amplification over a second band of wavelengths.

5. The amplification system as defined in claim 4, wherein said first amplifier and said second amplifier comprise erbium-doped fiber amplifiers.

6. The amplification system as defined in claim 4, wherein said first amplifier and said second amplifier are connected in parallel.

7. The amplification system as defined in claim 4, wherein said first amplifier and said second amplifier are connected in series.

8. The amplification system as defined in claim 1, wherein:

said interferometric loop, said coupler and said amplifier comprise a first nonlinear Sagnac amplifier, said first Sagnac amplifier providing gain over a first spectral range; and said amplification system further comprises a second nonlinear Sagnac amplifier, said second nonlinear Sagnac amplifier comprising a respective interferometric loop, a respective coupler and a respective amplifier, said second nonlinear Sagnac amplifier having gain over a second spectral range.

9. An amplification system for reducing output power differences in a plurality of output optical signals responsive to a plurality of input optical signals having a plurality of respective optical wavelengths and having a plurality of respective input powers, said amplification system comprising:

an interferometric loop comprising first and second lengths of optical fiber, said first length of optical fiber substantially longer than said second length of optical fiber;

a coupler that couples said optical signals into said interferometric loop to cause respective first and second portions of said optical signals to counterpropagate in first and second directions in said interferometric loop, said coupler combining said respective first and second portions of said optical signals after propagation through said interferometric loop to produce a plurality of respective output signals at said plurality of optical wavelengths, said plurality of output signals having a plurality of respective output powers; and an amplifier having a location in said interferometric loop between said first and second lengths of optical fiber, said amplifier having a gain characteristic which causes said amplifier to have a plurality of respective gains at said plurality of optical wavelengths, said first and second portions of said optical signals propagating in said first and second directions experiencing respective Kerr-induced phase shifts caused by self-phase modulation, by copropagating cross-phase modulation, and by counterpropagating cross-modulation, said location of said amplifier:

causing light propagating in said first direction to pass through said first length of optical fiber before propagating through said amplifier and said second length of optical fiber, causing light propagating in said second direction to propagate through said second length of optical fiber and said amplifier before propagating through said first length of optical fiber, causing said light propagating in said first direction to experience greater counterpropagating cross-phase modulation than said light propagating in said second direction, and causing said light propagating in said second direction to experience greater self-phase modulation and greater copropagating cross-modulation than light propagating in said first direction, said Kerr-induced phase shifts of said plurality of optical signals at said plurality of optical wavelengths being responsive to said respective amplifier gains at said plurality of optical wavelengths and being further responsive to said respective input powers of said plurality of optical signals such that differences in said output powers caused by differences in said input powers and said gains at said plurality of optical wavelengths are reduced.

10. The amplification system as defined in claim 9, wherein said amplifier comprises at least a first amplifier, which provides amplification over a first band of wavelengths, and comprises at least a second amplifier, which provides amplification over a second band of wavelengths.

11. The amplification system as defined in claim 10, wherein said first amplifier and said second amplifier comprise erbium-doped fiber amplifiers.

12. The amplification system as defined in claim 10, wherein said first amplifier and said second amplifier are connected in parallel.

13. The amplification system as defined in claim 10, wherein said first amplifier and said second amplifier are connected in series.

14. The amplification system as defined in claim 9, wherein:

said interferometric loop, said coupler and said amplifier comprise a first nonlinear Sagnac amplifier, said first Sagnac amplifier providing gain over a first spectral range; and said amplification system further comprises a second nonlinear Sagnac amplifier, said second nonlinear Sagnac amplifier comprising a respective interferometric loop, a respective coupler and a respective amplifier, said second nonlinear Sagnac amplifier having gain over a second spectral range.

15. An optical amplification system comprising:

at least first and second amplification sections, said first amplification section coupled to receive a plurality of input optical signals, each input optical signal having a respective optical wavelength and a respective input optical power, each amplification section including a respective amplifier therein, said amplifiers having respective gain characteristics such that gains applied to said optical signals vary with wavelength, said first amplification section providing a first plurality of optical output signals, said second amplification section coupled to receive said first plurality of optical output signals and to provide a second plurality of optical output signals, each of said second plurality of optical output signals having a respective one of said optical wavelengths and having a respective output optical power, said amplification sections operating to reduce differences in said respective output optical powers of said second plurality of optical output signals caused by differences in said input optical powers and by differences in gains applied to said optical signals, each amplification section comprising:

an interferometric loop, said amplifier of said amplification section being located asymmetrically in said loop; and a coupler which couples light to said interferometric loop to cause said light to propagate as first and second counterpropagating portions at each of said optical wavelengths and which combines said first and second counterpropagating portions at each of said wavelengths after said first and said counterpropagating portions of said light have propagated through said loop, said first and second counterpropagating portions at each of said wavelengths interfering to provide an output signal at each of said wavelengths, said output signal at each of said wavelengths having a power responsive to input power at said wavelength, responsive to amplifier gain at said wavelength, and responsive to Kerr-induced phase shift at said wavelength, said Kerr-induced phase shift being greater for optical wavelengths having greater gain-power products to at least partially reduce differences in output power caused by differences in gain-power products.

16. The amplification system as defined in claim 15, wherein each of said amplifiers comprises an erbium-doped fiber amplifier.

17. The amplification system as defined in claim 15, wherein said amplifiers have gains which vary with optical wavelength and wherein said input optical signals at said plurality of wavelengths have varying powers, said amplification sections operating to cause output powers at each of said wavelengths to converge toward output powers within a selectable range of output powers.

18. The amplification system as defined in claim 15, wherein each of said amplifiers comprises at least a first amplifier, which provides amplification over a first band of wavelengths, and comprises at least a second amplifier, which provides amplification over a second band of wavelengths.

19. The amplification system as defined in claim 18, wherein said first amplifier and said second amplifier comprise erbium-doped fiber amplifiers.

20. The amplification system as defined in claim 18, wherein said first amplifier and said second amplifier are connected in parallel.

21. The amplification system as defined in claim 18, wherein said first amplifier and said second amplifier are connected in series.

* * * * *

UNITED STATES PATENT AND TRADEMARK OFFICE
CERTIFICATE OF CORRECTION

PATENT NO.     : 6,377,391 B1  
DATED          : April 23, 2002  
INVENTOR(S)    : Benjamin J. Vakoc et al.

It is certified that error appears in the above-identified patent and that said Letters Patent is hereby corrected as shown below:

<u>Column 9,</u>
Line 28, Equation (1) change "$d\phi_i$" to -- $d\theta_i$ --.

Signed and Sealed this

Twenty-first Day of October, 2003

JAMES E. ROGAN
*Director of the United States Patent and Trademark Office*